(12) United States Patent
Izumi et al.

(10) Patent No.: US 7,578,627 B2
(45) Date of Patent: Aug. 25, 2009

(54) IMAGER APPARATUS

(75) Inventors: Koji Izumi, Kanagawa (JP); Masanori Kishi, Tokyo (JP)

(73) Assignee: Sony Corporation, Tokyo (JP)

( * ) Notice: Subject to any disclaimer, the term of this patent is extended or adjusted under 35 U.S.C. 154(b) by 511 days.

(21) Appl. No.: 11/526,588

(22) Filed: Sep. 26, 2006

(65) Prior Publication Data

US 2007/0081820 A1 Apr. 12, 2007

(30) Foreign Application Priority Data

Oct. 12, 2005 (JP) .............................. 2005-297904

(51) Int. Cl.
G03B 17/00 (2006.01)
G03B 17/02 (2006.01)

(52) U.S. Cl. ..................... 396/448; 396/535; 396/541

(58) Field of Classification Search ............... 396/6, 396/106, 138, 439, 448, 535, 541; 353/119; 361/679; 359/511
See application file for complete search history.

(56) References Cited

U.S. PATENT DOCUMENTS 5,628,032 A * 5/1997 Zander ..................... 396/6

2007/0274029 A1* 11/2007 Lee et al. ................... 361/679

OTHER PUBLICATIONS

U.S. Appl. No. 11/526,635, filed Sep. 26, 2006, Izumi, et al.
U.S. Appl. No. 11/526,588, filed Sep. 26, 2006, Izumi, et al.

* cited by examiner

Primary Examiner—Melissa J Koval
(74) Attorney, Agent, or Firm—Oblon, Spivak, McClelland, Maier & Neustadt, P.C.

(57) ABSTRACT

An imager apparatus is provided, including a housing that stores a lens device with an imaging lens exposed to the front surface facing a subject; a lens cover movable between a first position covering the imaging lens and a second position opening the same; and a cover moving mechanism linearly moving the lens cover between the first and second positions. The cover moving mechanism includes a plurality of brackets provided on the lens cover; a plurality of opening portions provided in the front surface of the housing, corresponding to the plurality of brackets, through which the tips of the brackets penetrate; an arm member fixed to those brackets on the inner side of the housing; a guide member guiding the arm member in the moving direction of the lens cover; and a slide joining mechanism joining the arm member to the guide member in a slidable manner.

9 Claims, 24 Drawing Sheets

FIG. 31A
FIG. 31B
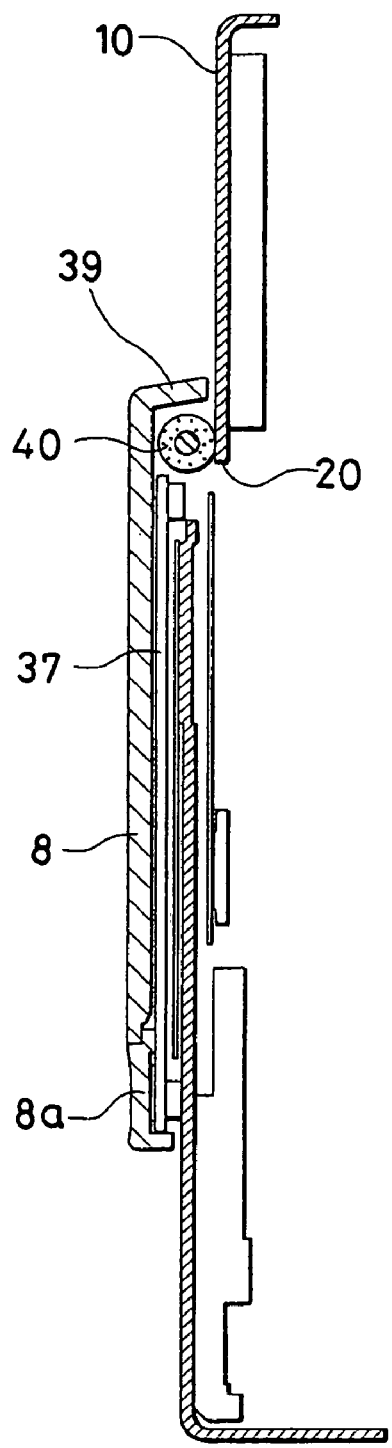
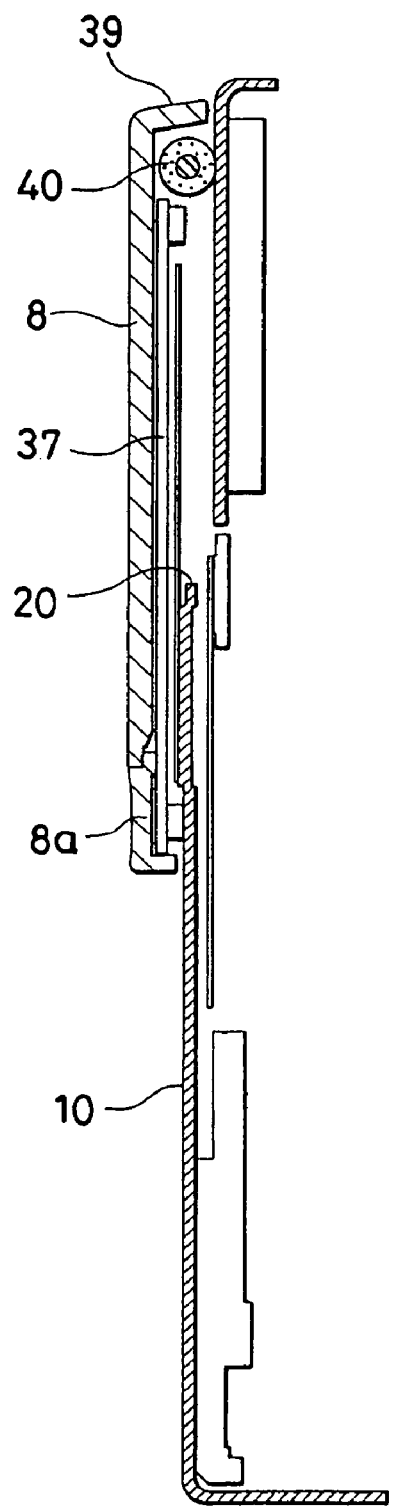

IMAGER APPARATUS

CROSS REFERENCES TO RELATED APPLICATIONS

The present invention contains subject manner related to Japanese Patent Application JP 2005-297904 filed in the Japanese Patent Office on Oct. 12, 2005, the entire contents of which being incorporated herein by reference.

BACKGROUND OF THE INVENTION

1. Field of the Invention

The present invention relates to an imager apparatus including a lens cover capable of moving between a first position to cover an imaging lens and a second position to open the imaging lens. When capturing images, the imaging lens is exposed by moving the lens cover to the second position, and other than capturing images, the imaging lens is protected by moving the lens cover to the first position.

2. Description of the Related Art

Japanese Patent Application Publication No. 2005-115109 discloses this kind of imager apparatus in related art, for example. This patent document discloses a slide cover capable of stably performing smooth opening-and-closing action, which is thin and easy to be installed in a main body portion, and an electronic apparatus including the slide cover (hereinafter referred to as a first related-art example). The slide cover relating to this first related-art example includes: a covering outer plate, a structural member fixed to the back surface of the covering outer plate, a holding member positioned in space between the covering outer plate and the structural member in a movable manner, and a toggle mechanism provided between the holding member and the covering outer plate or the structural member. The holding member is provided with two racks extending parallel to each other and a guide portion extending in the same direction as the racks at both ends. Further, the holding member includes a holding plate, an even number of pinion gears supported by the holding plate in a freely rotatable manner and fitted to each other, and a guide body supported by the holding plate in such a position that the even number of pinion gears are held in between. The pinion gears positioned at both ends among the even number of pinion gears are fitted to the racks and the guide body engages with the guide portion in a freely slidable manner, and so the direction in which the toggle mechanism forces the holding member is reversed at approximately the midpoint of the moving range of the holding member.

According to the slide cover with the above-described structure of Japanese Patent Application Publication No. 2005-115109, the following effectiveness can be obtained. Specifically, all the necessary members are supported by the covering outer plate and the structural member fixed to the back surface of the covering outer plate, and so there are no members provided on the main body portion side where the slide cover is attached, and there is no need to provide the main body portion side with a space for arranging members for the slide cover. Therefore, the main body portion can be small-sized (see paragraph [0016] in specification).

Japanese Patent Application Publication No. 2000-305131 discloses another example of this kind of imager apparatus in related art, for example. This patent document discloses a lens cover opening-and-closing mechanism which opens and closes a lens cover for protecting a lens of a camera or the like when not being used (hereinafter referred to as a second related-art example). The lens cover opening-and-closing mechanism according to this second related-art example includes: a slide lid, a pair of pinion gears, a lever and a forcing member. The slide lid is supported in a slidable manner and has a pair of rack portions at parts on both sides with respect to the slidable direction. The pair of pinion gears are fitted in such a manner as to correspond to the rack portions of the slide lid. The lever is attached to one of the pinion gears in a rotatable manner. The forcing member forces the lever in one direction.

According to the lens cover opening-and-closing mechanism with the above structure described in Japanese Patent Application Publication No. 2000-305131, the following effectiveness and the like are expected. Specifically, main mechanical components can be stored in a space portion of the moving cover, and so a compact toggle-type opening-and-closing mechanism can be provided. Hence, the lens cover opening-and-closing mechanism can be assembled into a housing without greatly modifying the size of an optical apparatus itself that is a camera or the like (see paragraph [0026] in specification).

Further, Japanese Patent Application Publication No. 2004-180137 discloses a third example of this kind of imager apparatus in related art, for example. This patent document discloses an imager apparatus such as a digital camera in which a subject display portion that displays the subject is arranged in the vicinity of an imaging lens, and this subject display portion can be used as a finder (hereinafter referred to as a third related-art example). The imager apparatus described in this patent document includes: a housing in which an objective lens of an imaging lens is provided at the front surface facing a subject; a lid attached to the housing in a movable manner in several stages between a position to cover the objective lens and a position to open the objective lens; and a subject display device which displays the subject. The objective lens is opened at a first stage when the lid is opened, and the subject display device is opened at a second, third or further stage when the lid is opened.

According to the imager apparatus with the above-described structure of Japanese Patent Application Publication No. 2004-180137, the following effectiveness and the like can be obtained. Normal shooting can be performed at the first stage at the time of opening, and self-shooting can be performed at the second, third or further stage at the time of opening. Therefore, both the objective lens and the subject display device can be protected with one lid, and a camera capable of performing self-shooting can be made simplified in appearance, and so operability can be prevented from being impaired (see paragraph [0076] in specification).

However, in both the cases regarding the first and second related-art examples, there is a gear mechanism provided to open and close the lens cover, and the gear mechanism is arranged inside the lens cover. Typically, the extent of power transmitted by a gear mechanism varies depending on the strength of the gears used, and so in order to transmit power of some degree, it has been necessary to make the thickness of gears thick, correspondingly. For that reason, there has been a disadvantage that the lens cover incorporating the gear mechanism is made thick, and so the whole of the imager apparatus may be made not sufficiently thin.

Further, regarding the third related-art example, a plurality of semicircular convex portions are provided on the inner surface of the lid, a foreign-material removal member made of unwoven fabric and formed into ring shape is installed on each semicircular convex portion, and the foreign material removal member is made to slide in contact with the front surface of the housing. Therefore, in this third related-art example as well as in the first and second related-art examples, there has been a disadvantage that the lens cover is made thick, and so the whole of the imager apparatus may not be made sufficiently thin.

SUMMARY OF THE INVENTION

The present inventors have recognized that regarding an imager apparatus in related art, a lens cover is made thick, and the whole of an apparatus is enlarged, and so the whole of an imager apparatus is prevented from being made thin or small.

An imager apparatus according to an embodiment of the present invention includes: a housing in which a lens device is stored with an imaging lens exposed to the front surface facing a subject; a lens cover movable between a first position to cover the imaging lens and a second position to open the imaging lens; and a cover moving mechanism which linearly moves the lens cover between the first position and the second position. The cover moving mechanism includes: a plurality of brackets, a plurality of opening portions, an arm member, a guide member and a slide joining mechanism. The plurality of brackets are provided on the lens cover. The plurality of opening portions are provided in the front surface of the housing, corresponding to the plurality of brackets, through which tips of the brackets penetrate. The arm member is fixed to the plurality of brackets on the inner side of the housing. The guide member guides the arm member in the moving direction of the lens cover. The slide joining mechanism joins the arm member to the guide member in a slidable manner.

According to an embodiment of an imager apparatus, a cover moving mechanism which moves a lens cover between a first position and a second position is provided. The cover moving mechanism includes a plurality of brackets, a plurality of opening portions, an arm member, a guide member and a slide joining mechanism. Therefore, the lens cover can be made thin and light in weight. Further, the sliding motion of the lens cover can be performed reliably and smoothly, and an opening-and-closing action without a jolt can be obtained.

BRIEF DESCRIPTION OF THE DRAWINGS

FIGS. 29A and 29B show the front case in FIG. 24, in which FIG. 29A is a left side view and FIG. 29B is a right side view;

FIGS. 31A and 31B explain the relationship between a front case and a lens cover of the digital still camera in FIG. 1, in which FIG. 31A is an explanatory diagram of a state where, regarding a first part, the lens cover is in a second position and FIG. 31B is an explanatory diagram of a state where, regarding the first part, the lens cover is in a first position;

FIGS. 32A to 32C explain the relationship between a front case and a lens cover of the digital still camera in FIG. 1, in which FIG. 32A is an explanatory diagram of a state where, regarding a second part, the lens cover is in a second position, FIG. 32B is an explanatory diagram of a state where, regarding the second part, the lens cover is in a first position, and FIG. 32C is an explanatory diagram of a state where, regarding a third part, the lens cover is in the first position; and FIGS. 33A to 33C explain the relationship between a front case and a lens cover of the digital still camera in FIG. 1, in which FIG. 33A is an explanatory diagram of a part of a front case, where a stepped portion is provided, FIG. 33B is an explanatory diagram of a part of a front case, where no stepped portion is provided and FIG. 33C is an explanatory diagram of a case where a front case is not provided with a stepped portion.

DESCRIPTION OF THE PREFERRED EMBODIMENTS

An imager apparatus capable of opening and closing a lens cover without a jolt and of reducing the whole thickness and size of is obtained with a simplified structure by a cover moving mechanism linearly moving the lens cover between a first position and a second position.

Figure 1:
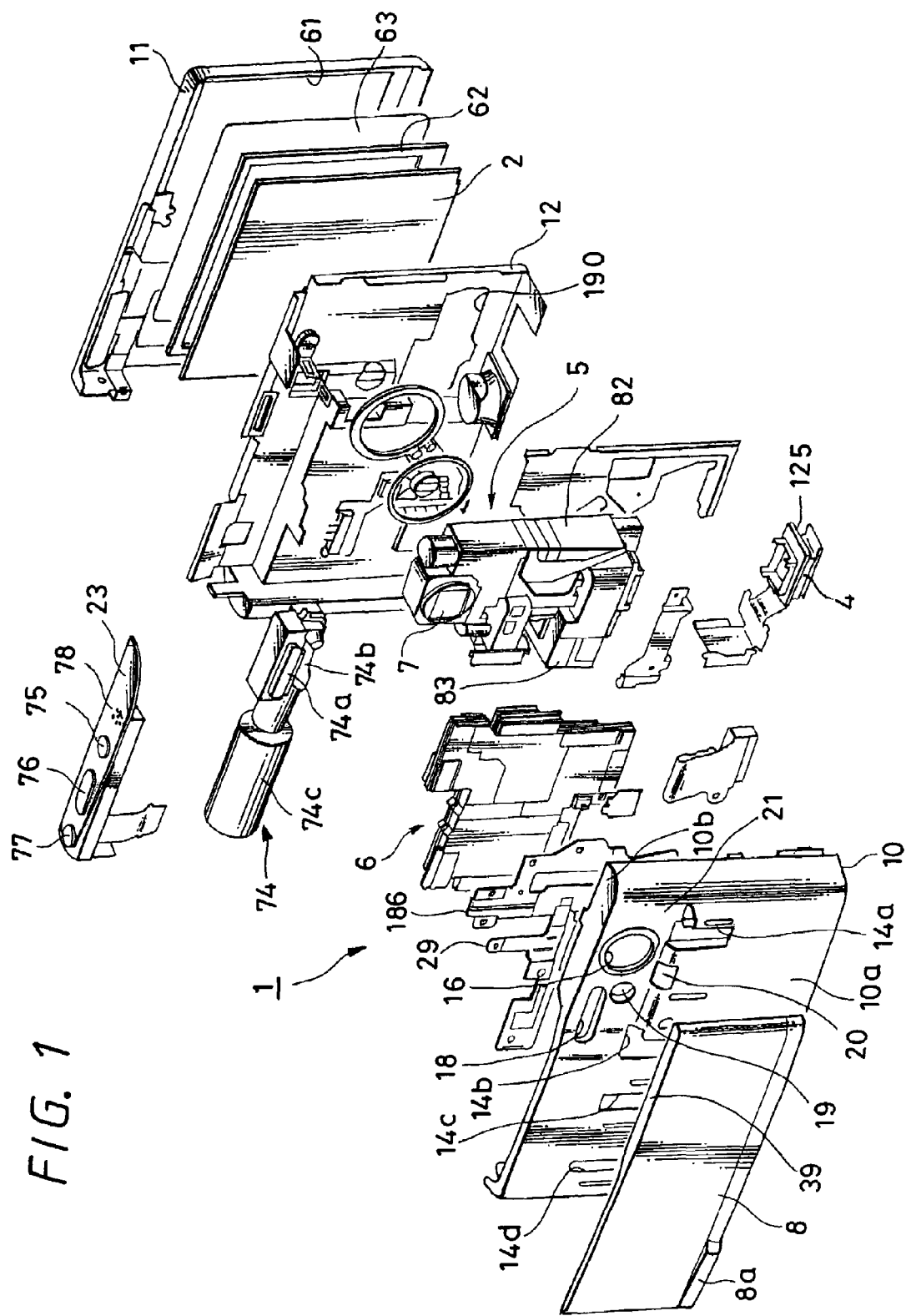
FIG. 1 is a perspective view showing in an exploded manner a digital still camera according to a first embodiment of an imager apparatus of the present invention.
Figure 2:
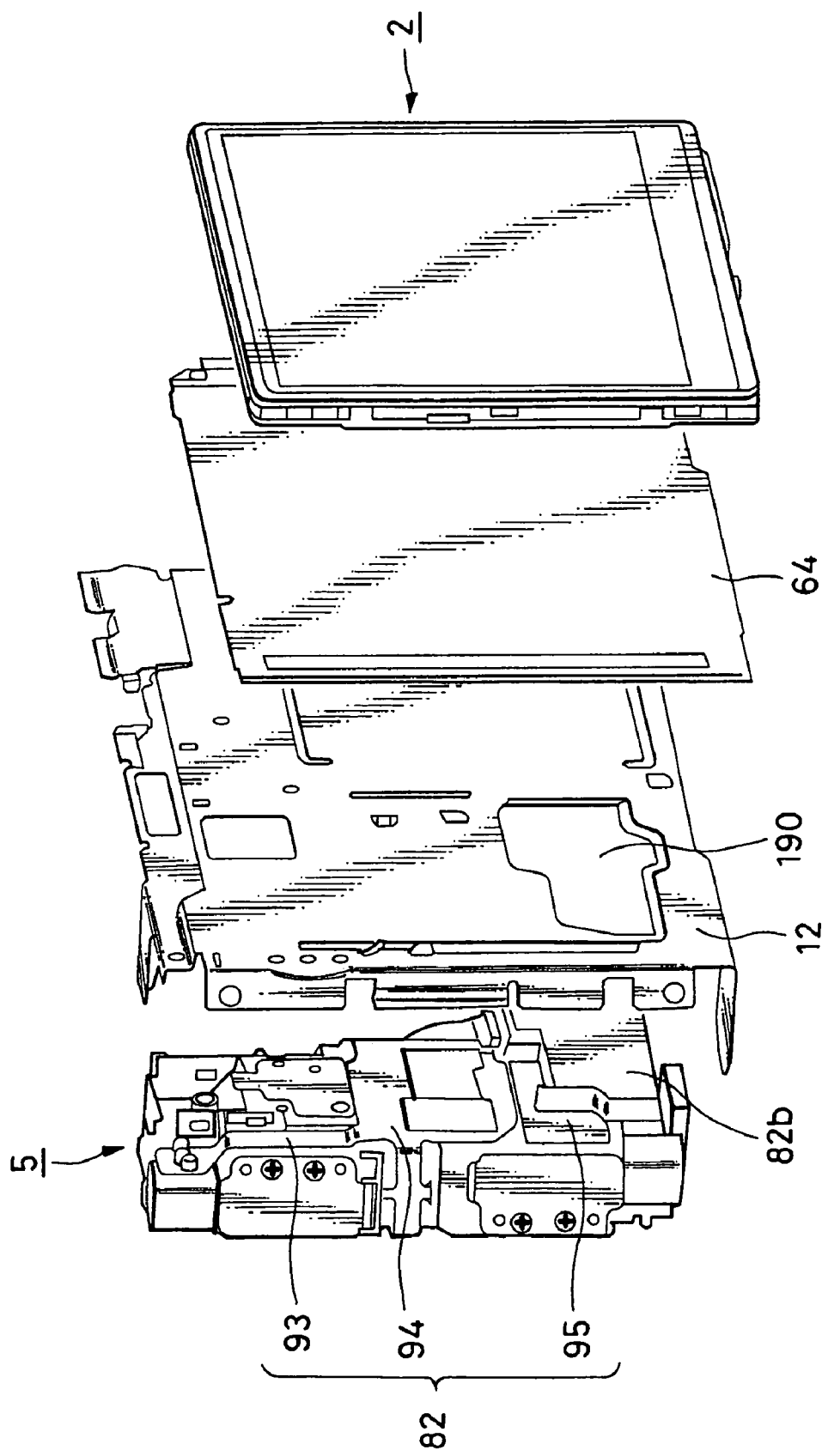
FIG. 2 is a perspective view of a lens device, a flat display panel and the like of the digital still camera in FIG. 1, as seen from the rear side.
Figure 3:
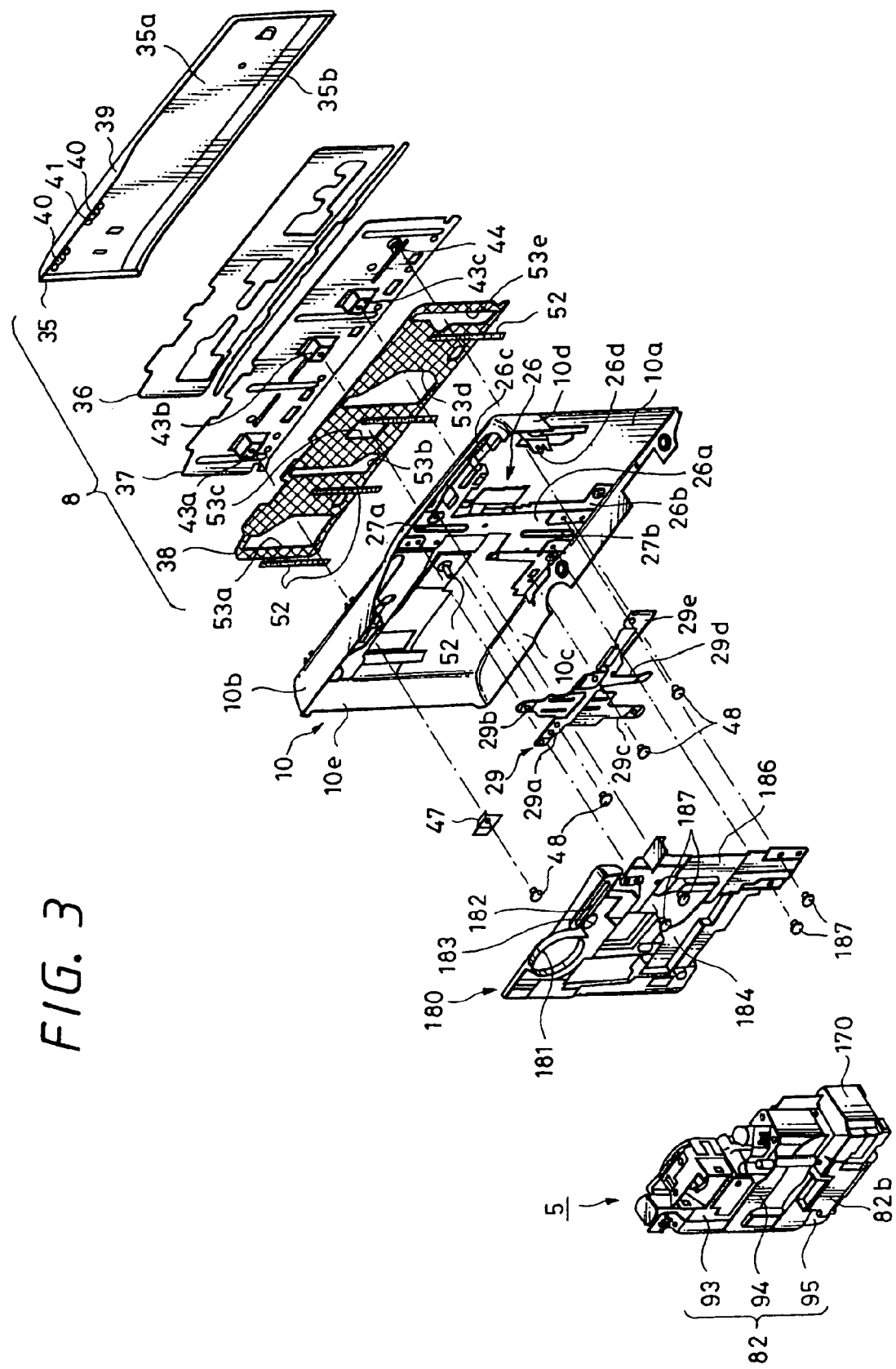
FIG. 3 is a perspective view showing in an exploded manner a lens device, a front case, a lens cover and the like of the digital still camera in FIG. 1.
Figure 4:
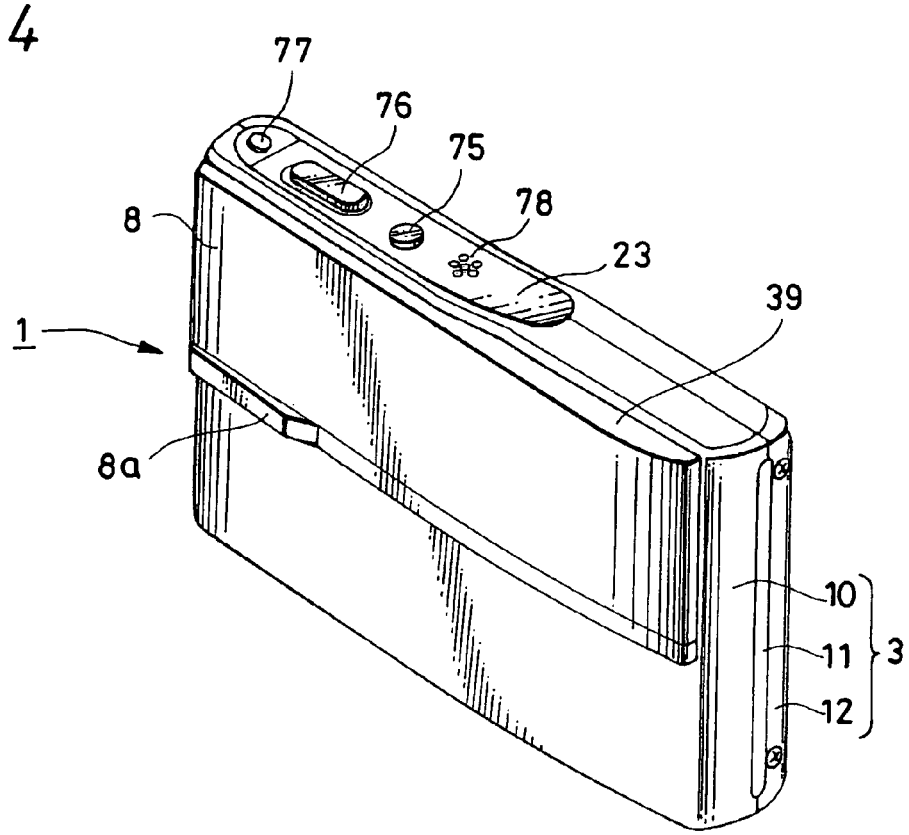
FIG. 4 is a perspective view of a digital still camera according to the first embodiment of an imager apparatus as seen from the front side, when a lens cover has been moved to a first position to cover an imaging lens.
Figure 5:
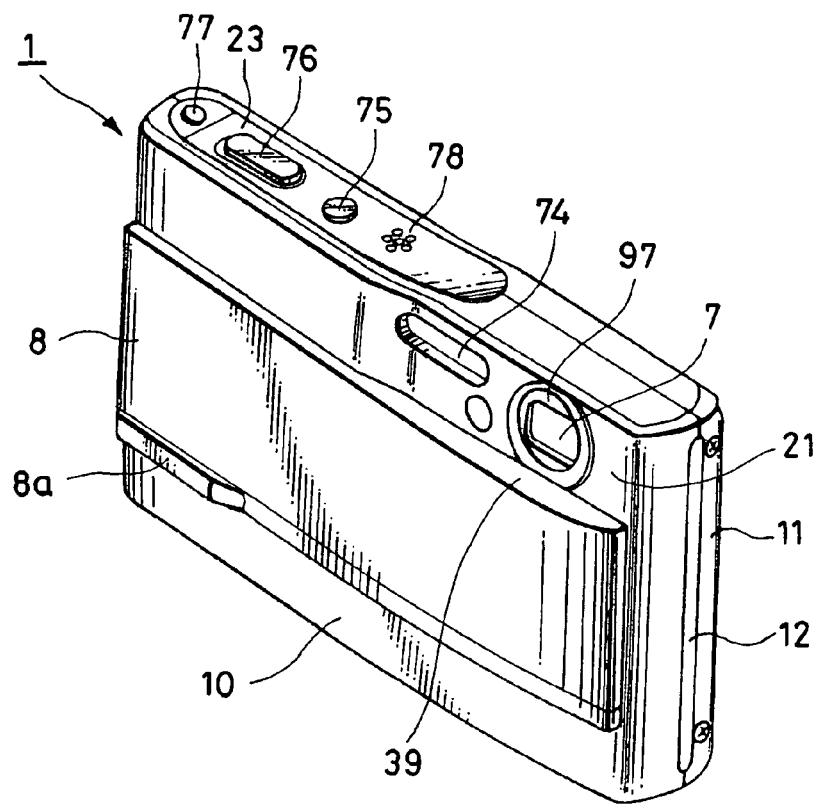
FIG. 5 is a perspective view of the digital still camera shown in FIG. 4, in which an imaging lens has been opened (exposed) by moving a lens cover to a second position.
Figure 6:
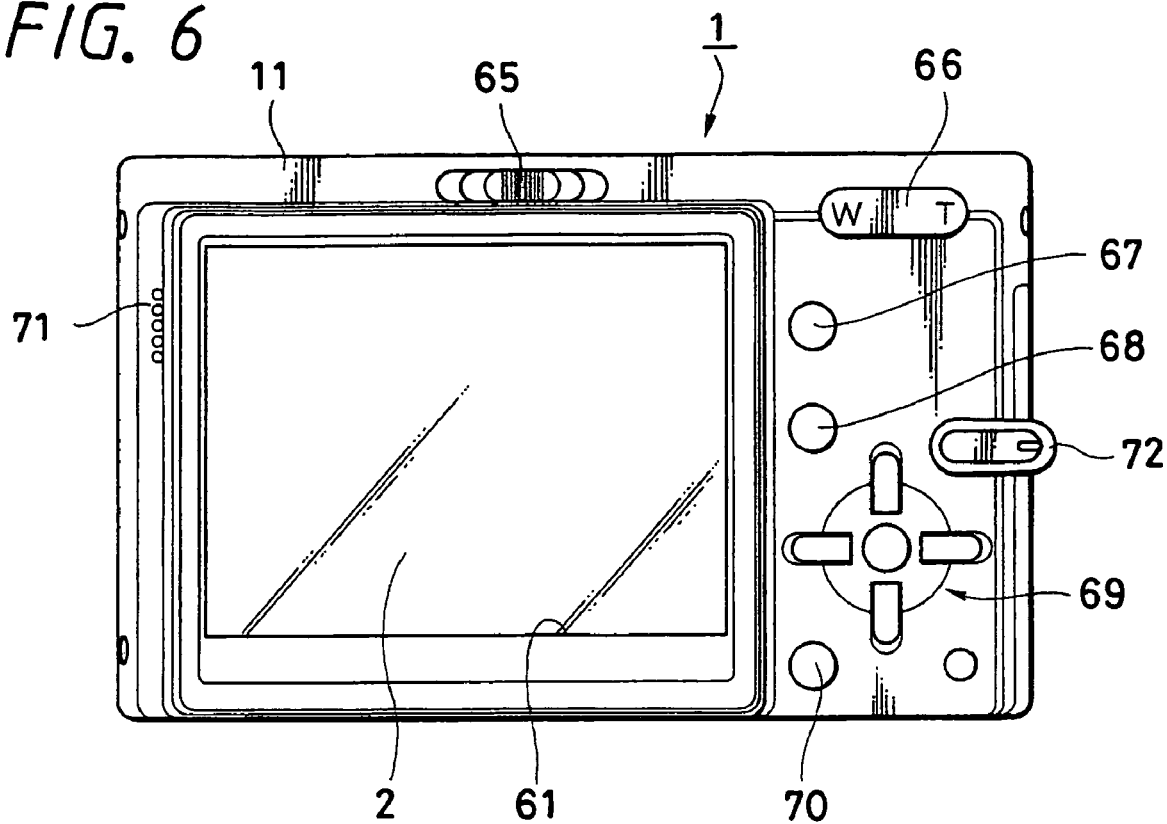
FIG. 6 is a rear view of the digital still camera in FIG. 4.
Figure 7:
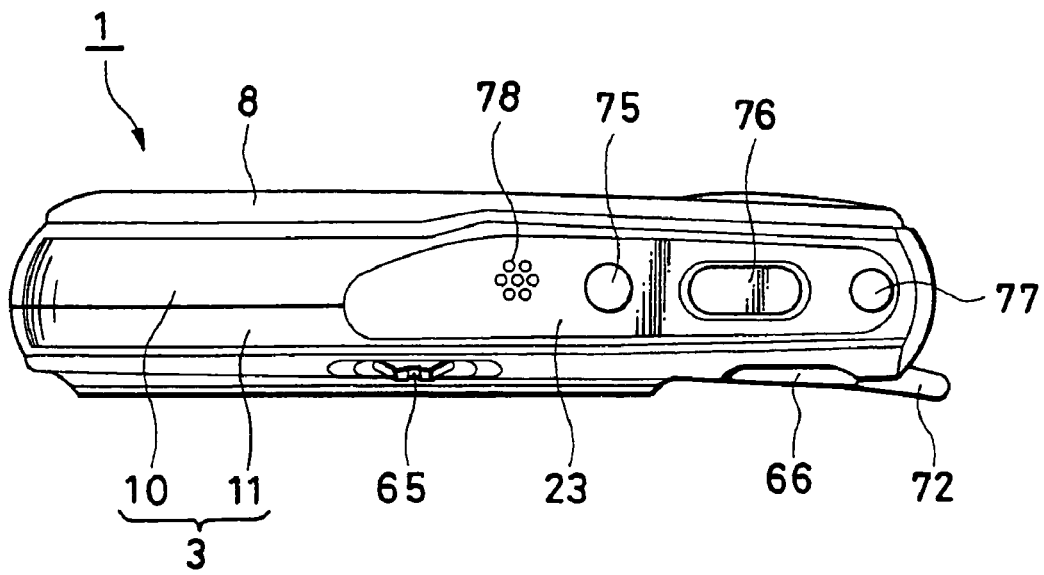
FIG. 7 is a plan view of the digital still camera in FIG. 4.
Figure 8:
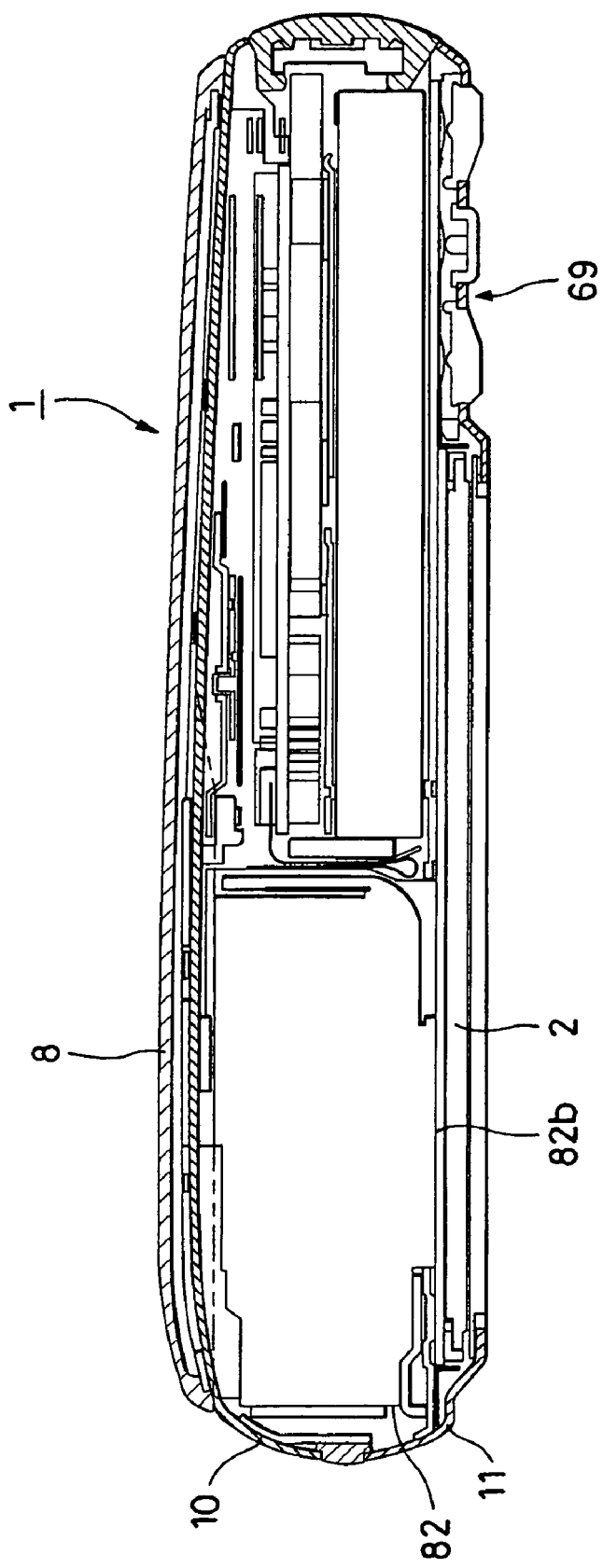
FIG. 8 is an explanatory diagram in which the digital still camera in FIG. 4 is shown in cross section in a lateral direction.

An embodiment of the present invention is explained with referring to the attached drawings. FIGS. 1 to 33 show an embodiment of the present invention. Specifically, FIG. 1 is an exploded perspective view of a digital still camera showing a first embodiment of an imager apparatus according to the present invention. FIG. 2 is a perspective view of a lens device, a flat display panel and the like, as seen from the rear side. FIG. 3 is a perspective view showing a housing, a lens cover and the like in an exploded manner. FIG. 4 is a perspective view of a digital still camera when an imaging lens is covered with a lens cover, as seen from the front side. FIG. 5 is a perspective view in which an imaging lens has been exposed by moving a lens cover. FIG. 6 is a rear view, FIG. 7 is a plan view, and FIG. 8 is a cross sectional view.

Figure 9:
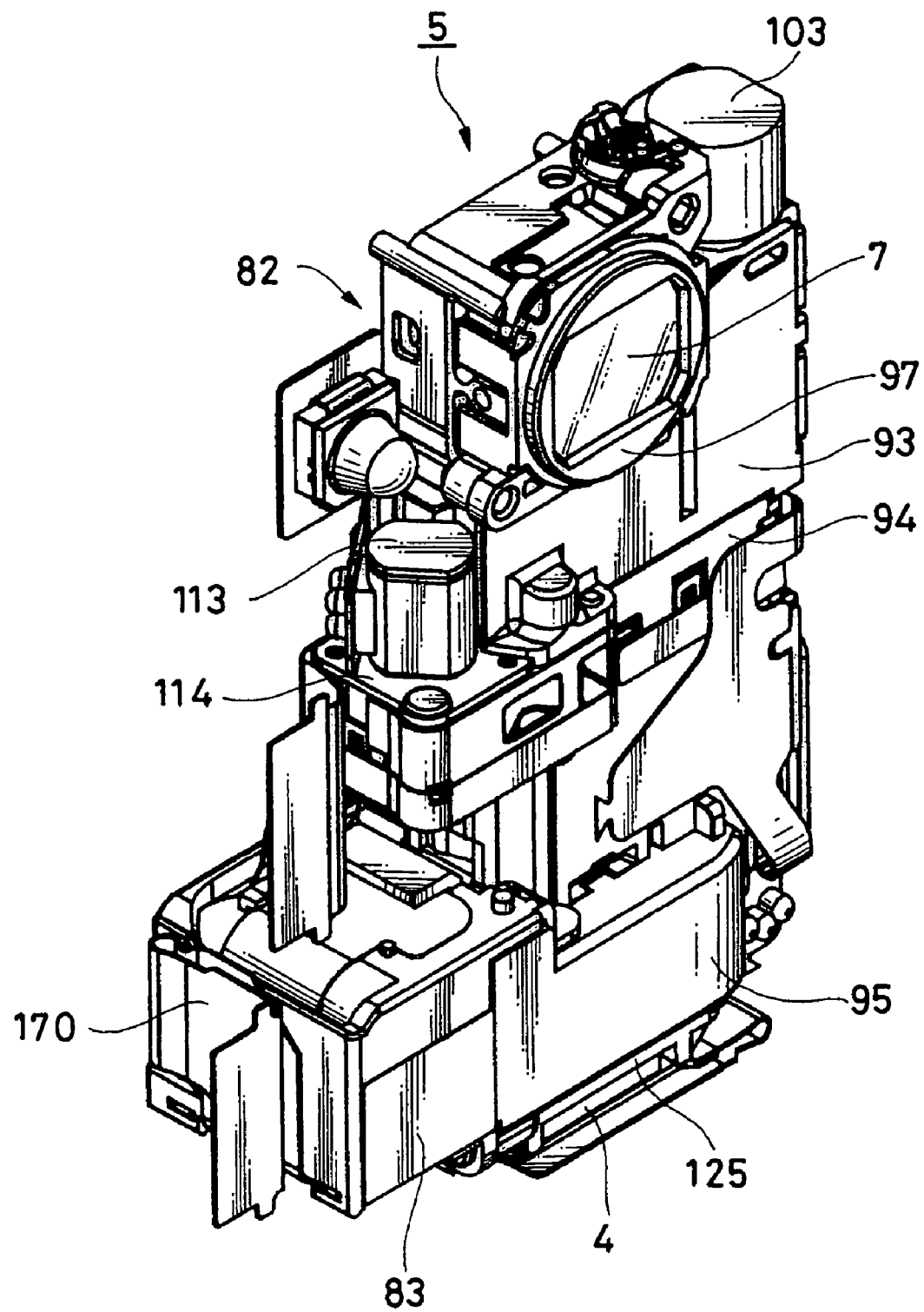
FIG. 9 is a perspective view of a lens device of the digital still camera in FIG. 4, as seen from the front side.
Figure 10:
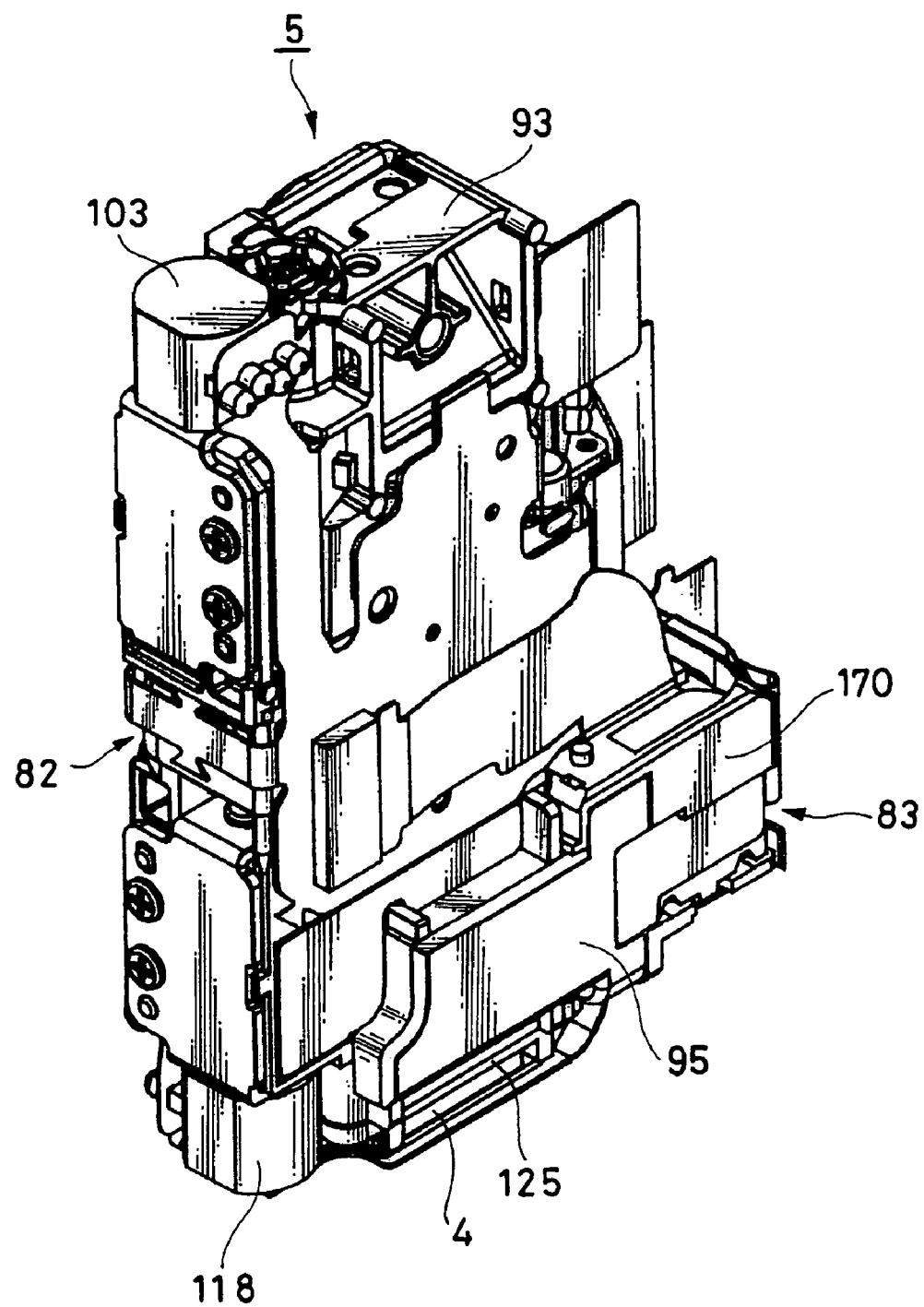
FIG. 10 is a perspective view of the lens device in FIG. 9, as seen from the rear side.
Figure 11:
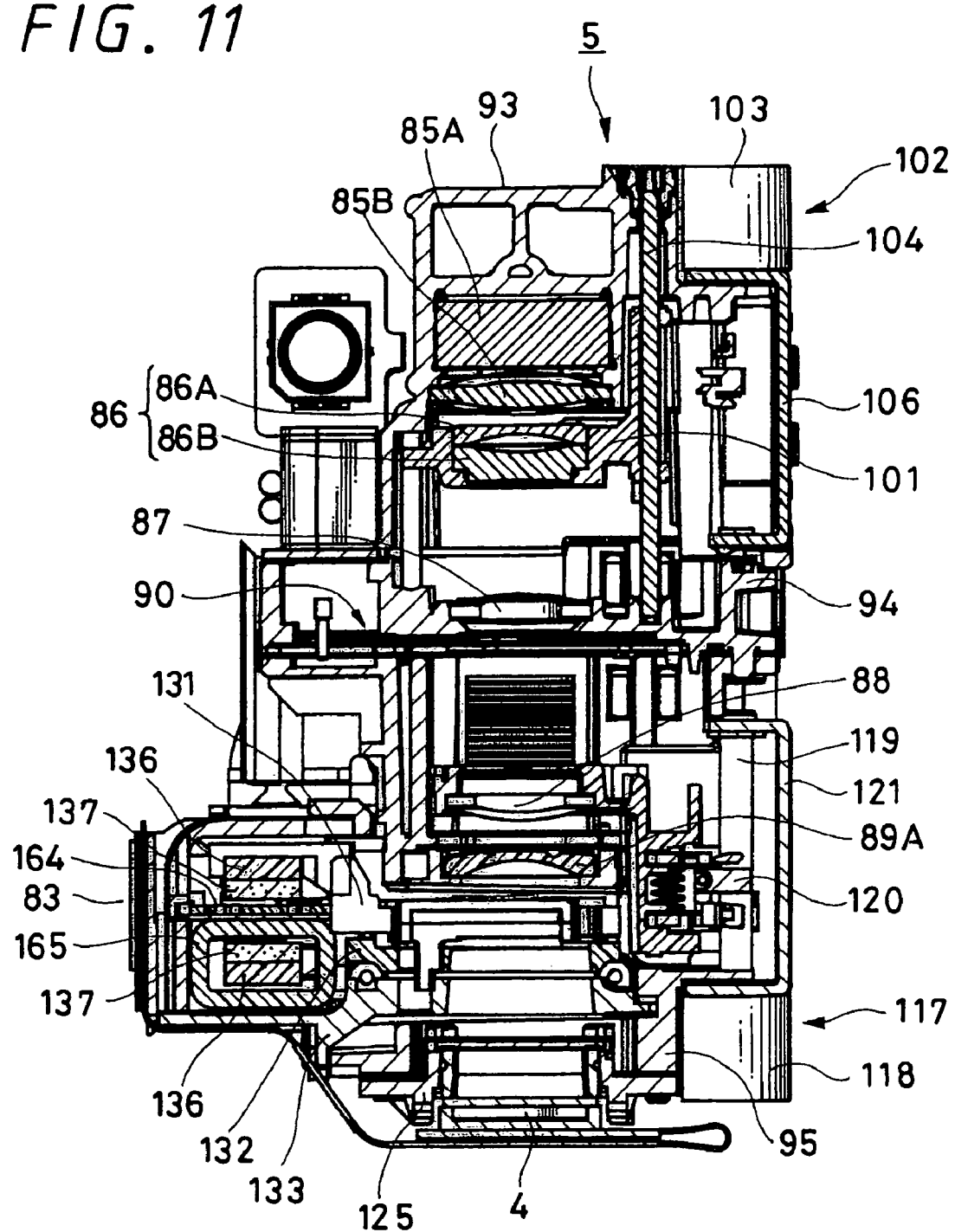
FIG. 11 is a sectional view in which the lens device in FIG. 9 is shown in cross section in a vertical direction perpendicular to an optical axis of an imaging lens.
Figure 12:
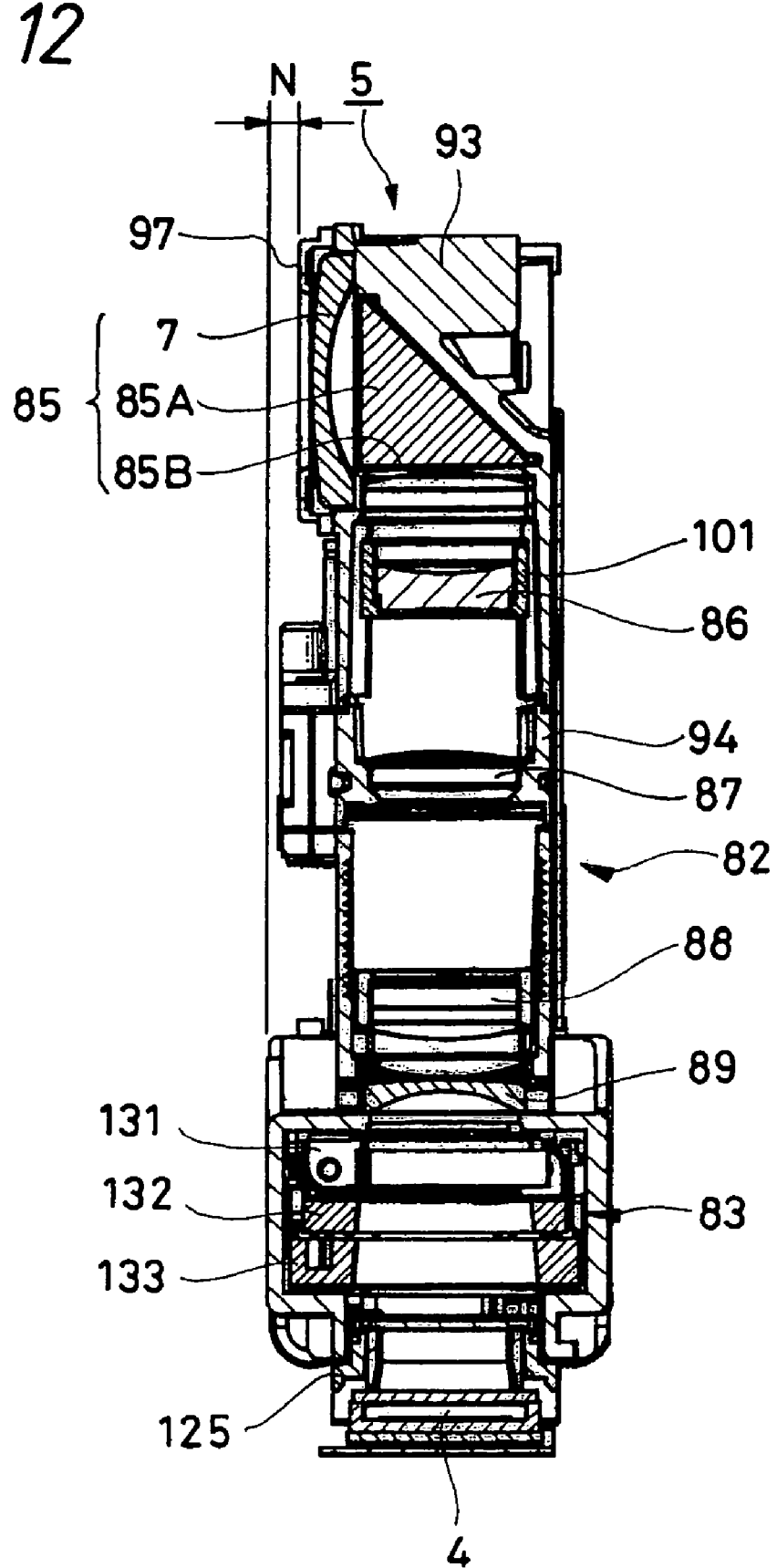
FIG. 12 is a sectional view in which the lens device in FIG. 9 is shown in cross section in a vertical direction parallel to an optical axis of an imaging lens.
Figure 13:
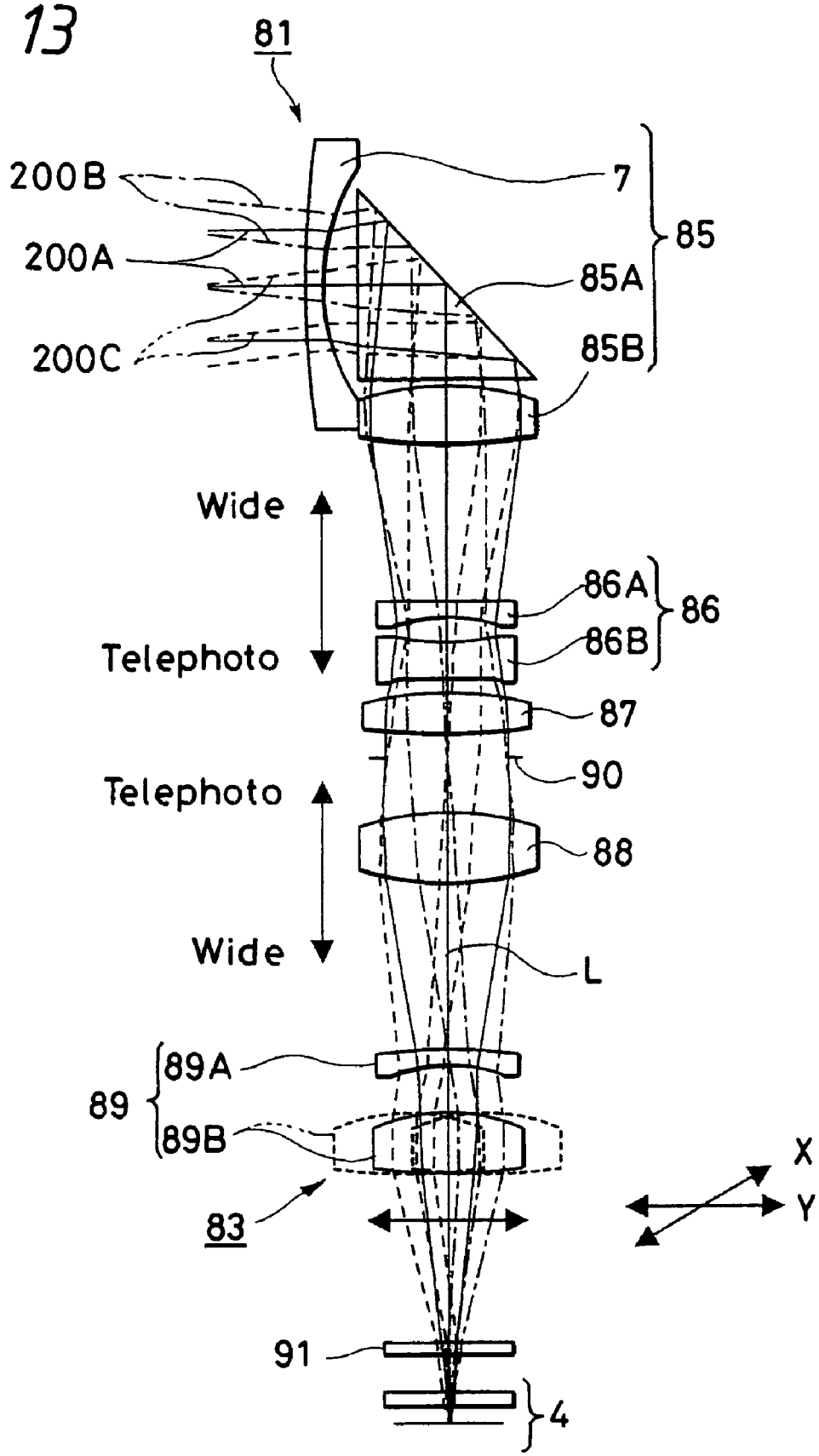
FIG. 13 is an explanatory diagram for explaining a lens system of the lens device in FIG. 9.
Figure 14:
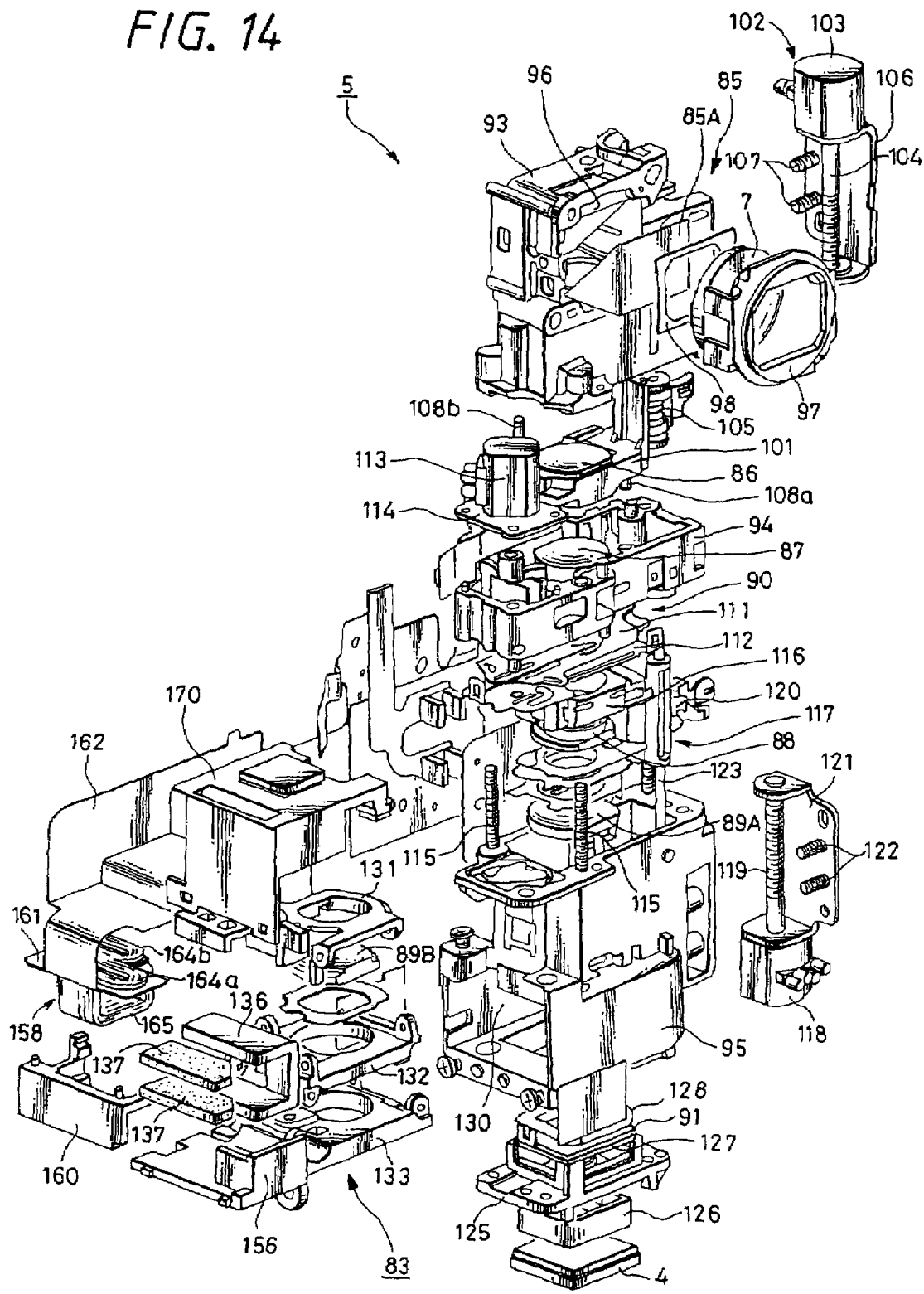
FIG. 14 is a perspective view in which the lens device in FIG. 9 is shown in an exploded manner.
Figure 15:
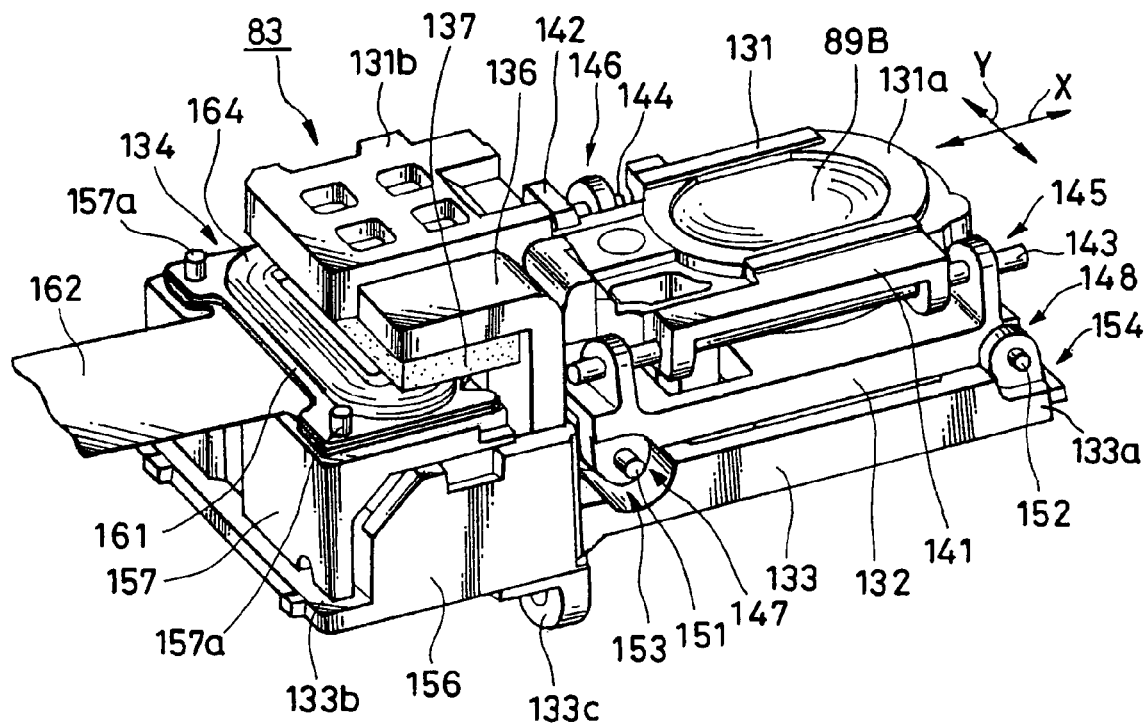
FIG. 15 is a perspective view of a camera shake correcting apparatus relating to the lens device in FIG. 9.
Figure 16:
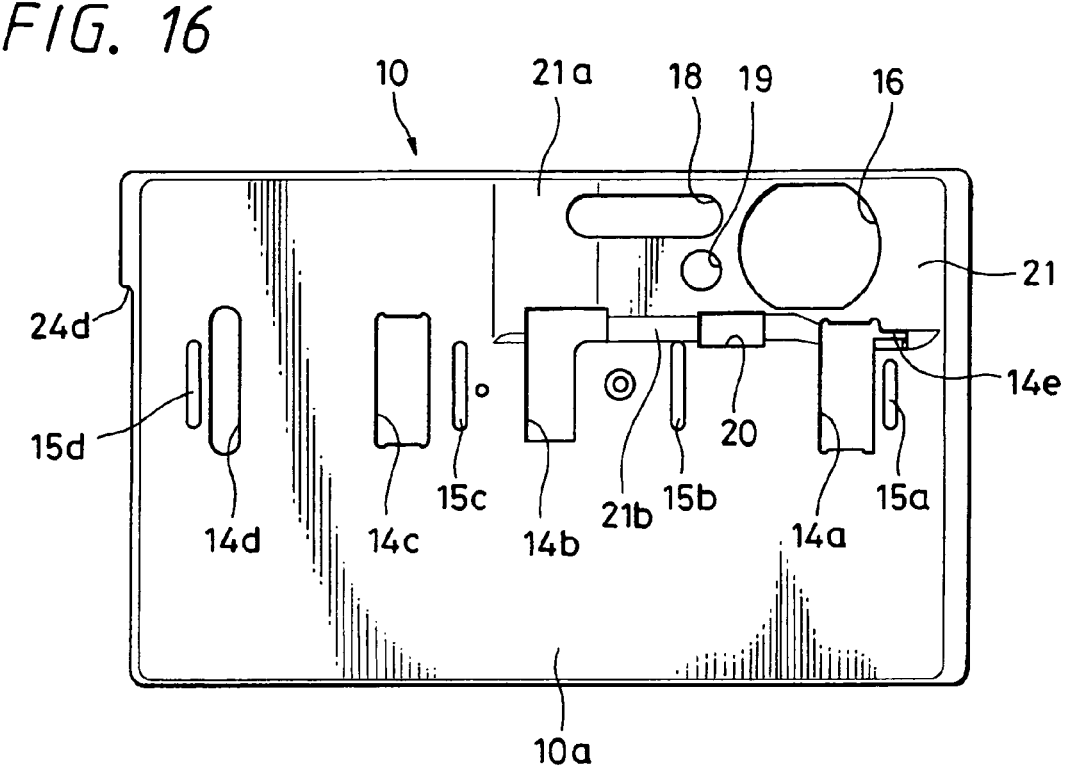
FIG. 16 is a front view of a front case of the digital still camera in FIG. 1.
Figure 17:
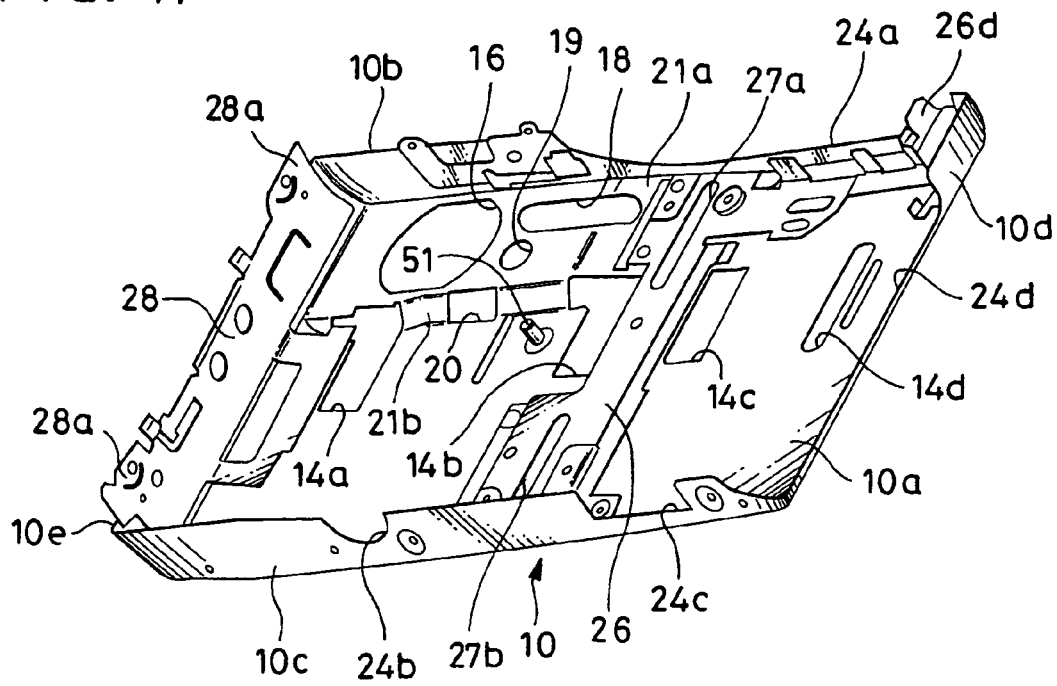
FIG. 17 is a perspective view of a front case of the digital still camera in FIG. 1, as seen from the rear side.
Figure 18:
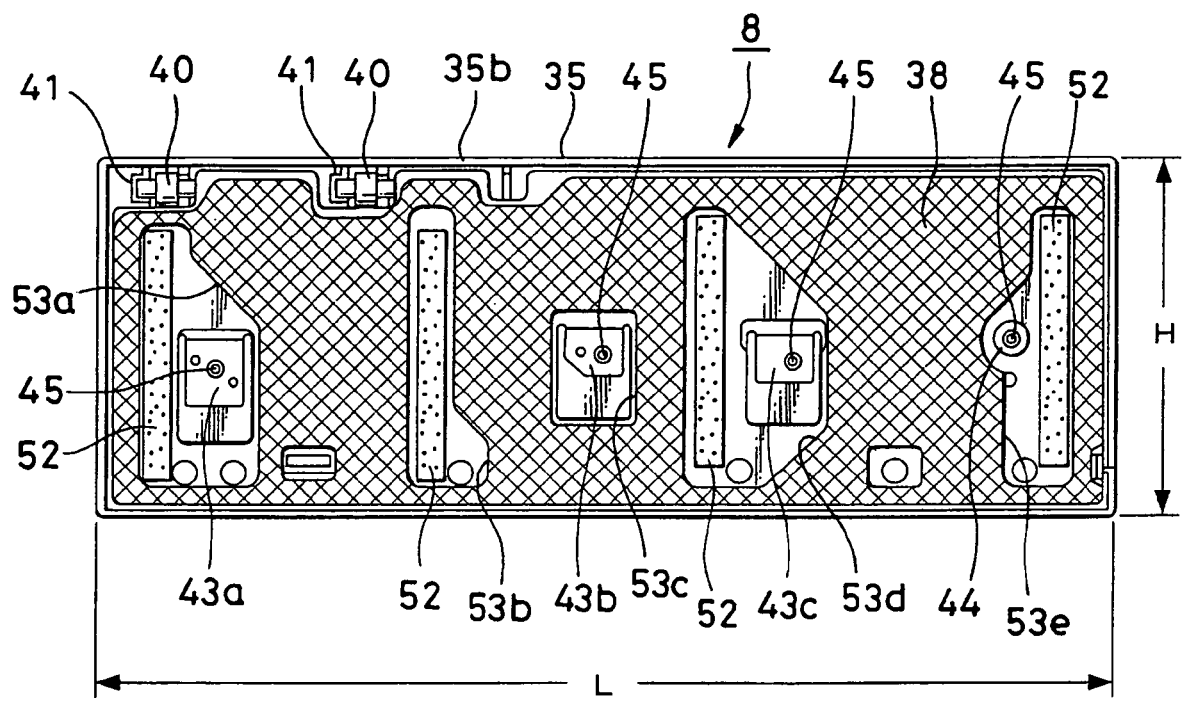
FIG. 18 is a rear view of a lens cover of the digital still camera in FIG. 1.
Figure 19:
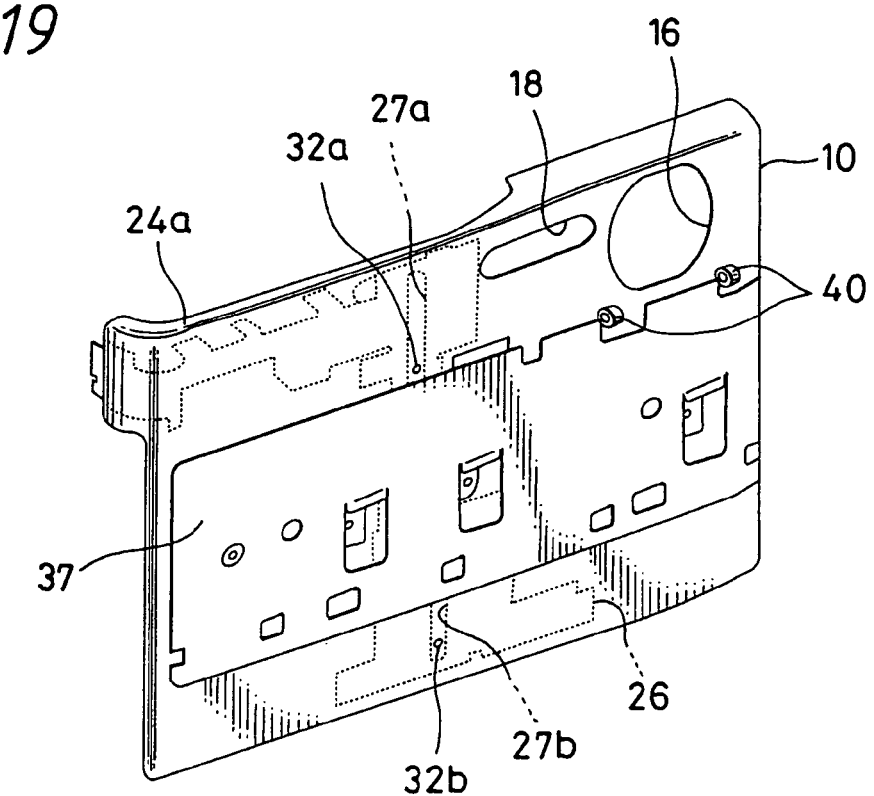
FIG. 19 is an explanatory diagram for explaining the relationship between a front case and a lens cover of the digital still camera in FIG. 1, in which the lens cover is in a second position.
Figure 20:
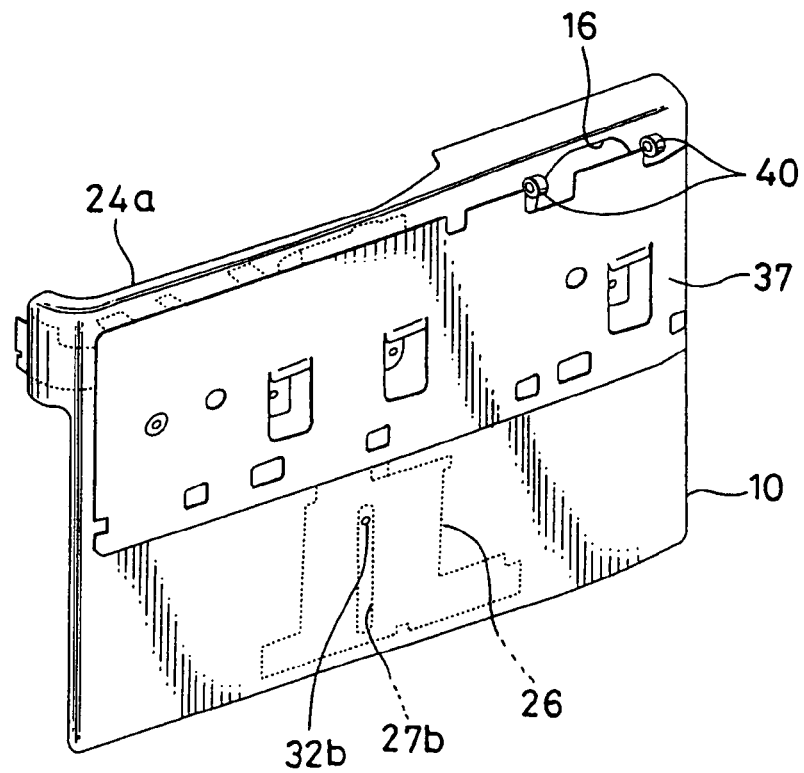
FIG. 20 is an explanatory diagram for explaining the relationship between a front case and a lens cover of the digital still camera in FIG. 1, in which the lens cover is in a first position.

FIG. 9 is a perspective view of a first practice example of a lens device relating to an imager apparatus according to an embodiment of the present invention, as seen from the front side. FIG. 10 is a perspective view, as seen from the rear side. FIG. 11 is a vertically sectional view shown in section as regards the surface direction of an imaging lens. FIG. 12 is a vertically sectional view shown in cross section as regards the direction perpendicular to the surface direction of an imaging lens. FIG. 13 is an explanatory diagram of a lens system. FIG. 14 is an exploded perspective view. FIG. 15 is a perspective view of a camera shake correcting apparatus of a lens device. FIG. 16 is a front view of a front case of a housing. FIG. 17 is a perspective view of a front case, as seen from the rear side. FIG. 18 is a rear view of a lens cover. FIG. 19 is a perspective view showing a state in which an imaging lens opening hole in a front case is opened by moving a lens cover. FIG. 20 is a perspective view showing a state in which an imaging lens opening hole is covered.

Figure 21:
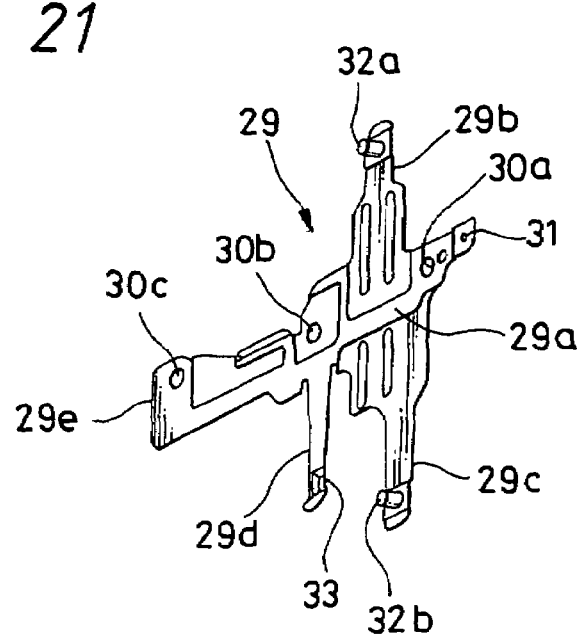
FIG. 21 is a perspective view of an arm member of the digital still camera in FIG. 1.
Figure 22:
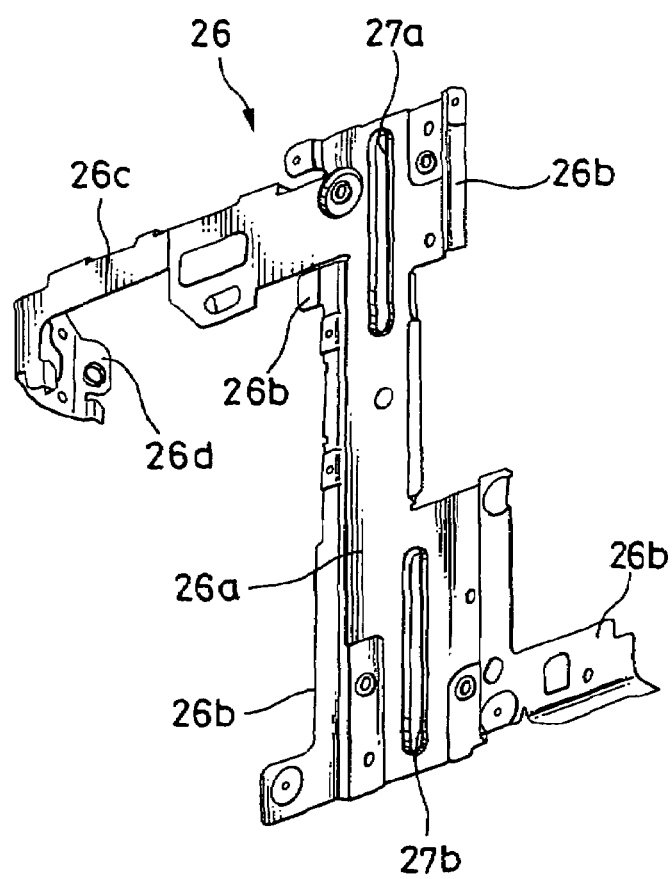
FIG. 22 is a perspective view of a guide member of the digital still camera in FIG. 1.
Figure 23:
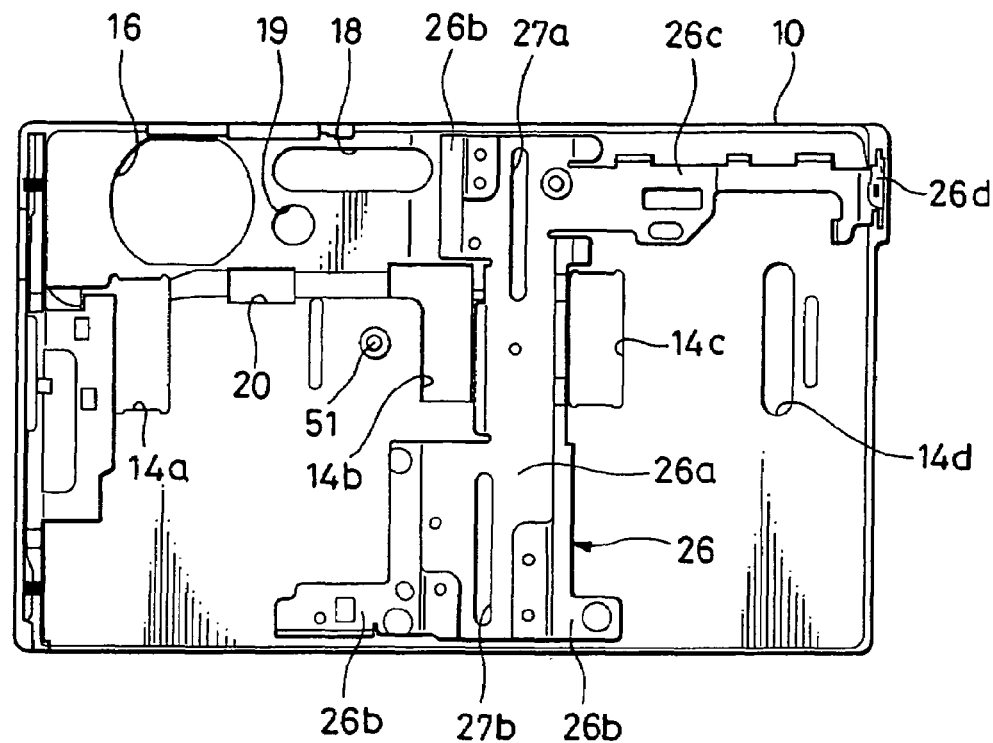
FIG. 23 is an explanatory diagram of a state in which a guide member has been attached to a front case of the digital still camera in FIG. 1.
Figure 24:
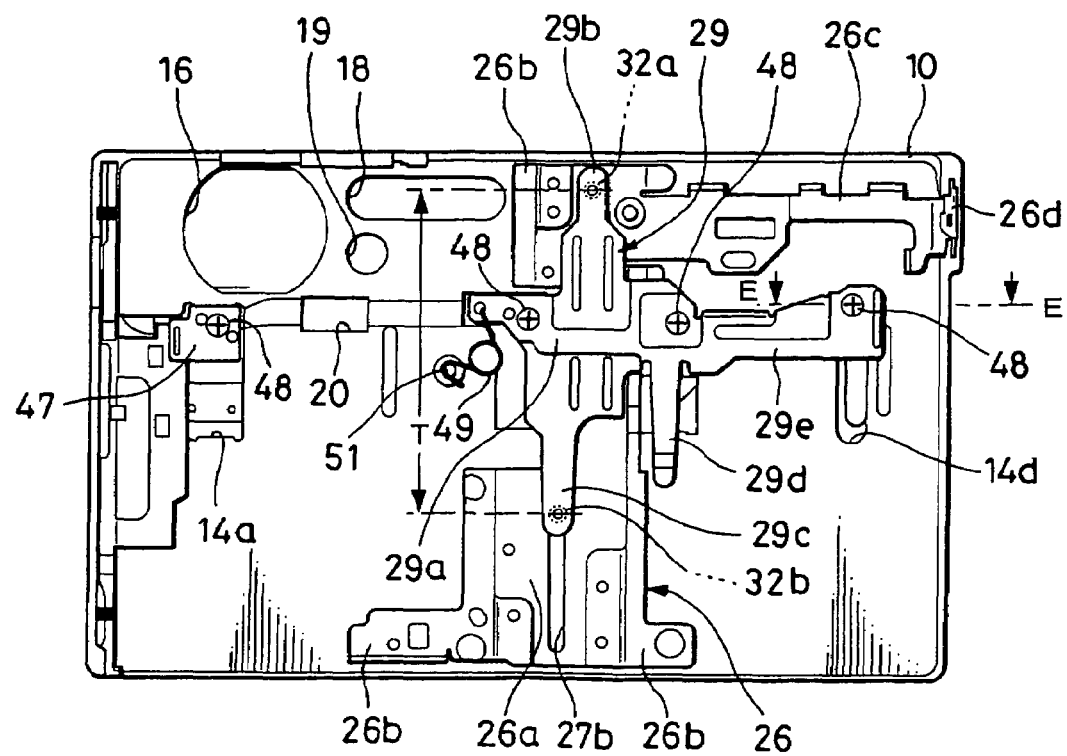
FIG. 24 is an explanatory diagram of a state in which an arm member is engaged with the guide member in FIG. 23.
Figure 25:
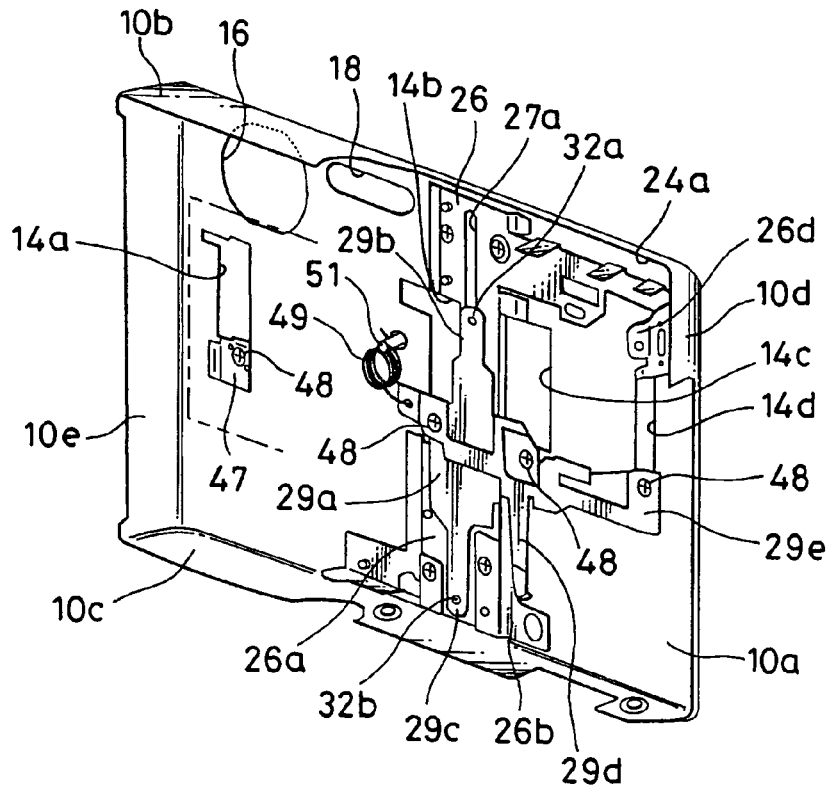
FIG. 25 is an explanatory diagram in which a lens cover is in a second position, when the guide member in FIG. 23 is engaged with an arm member.
Figure 26:
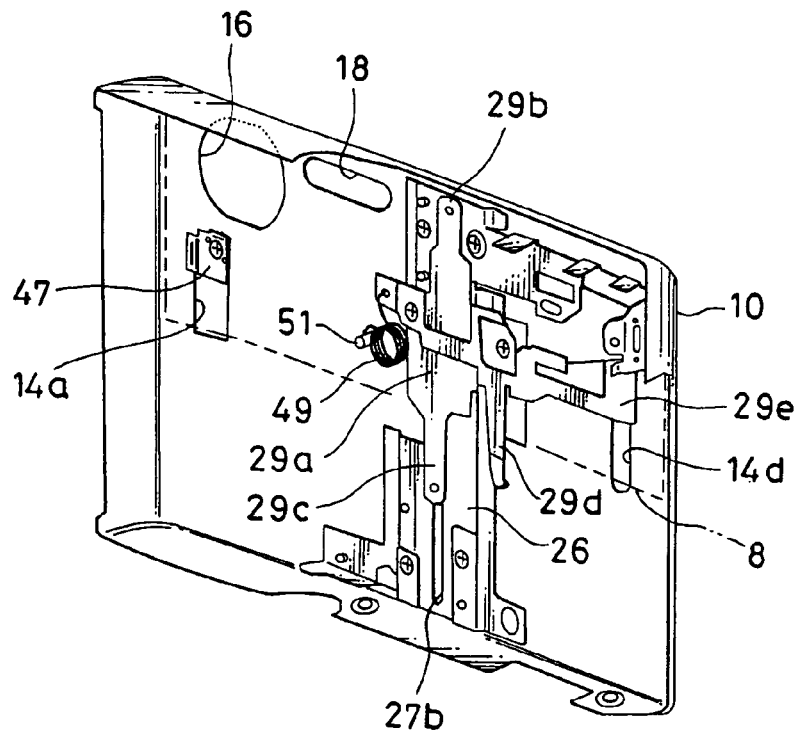
FIG. 26 is an explanatory diagram of a state in which a lens cover has been moved to a first position by moving an arm member from the state shown in FIG. 25.
Figure 27:
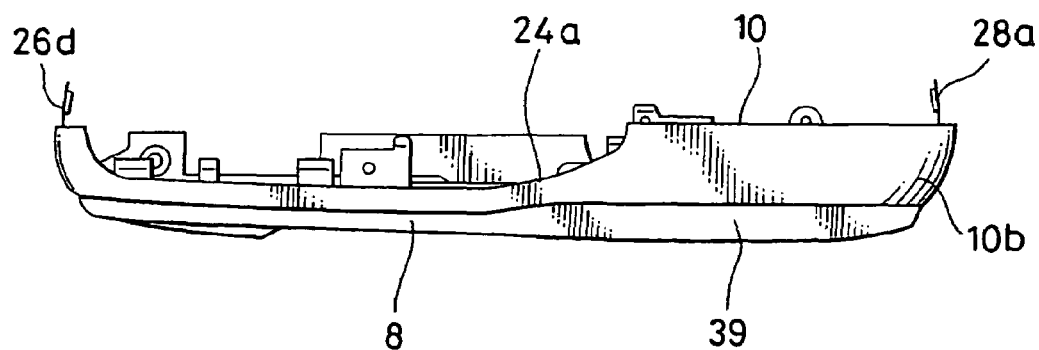
FIG. 27 is a plan view of the front case and the like in FIG. 24.
Figure 28:
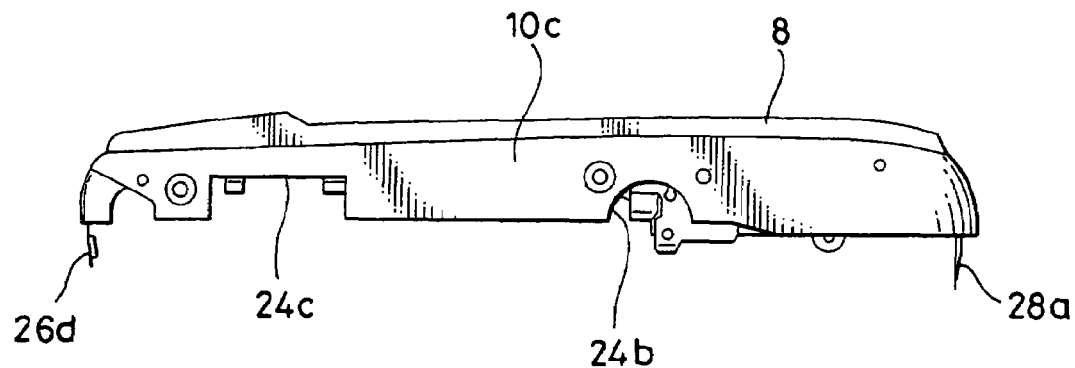
FIG. 28 is a bottom view of the front case and the like in FIG. 24.
Figure 29A:
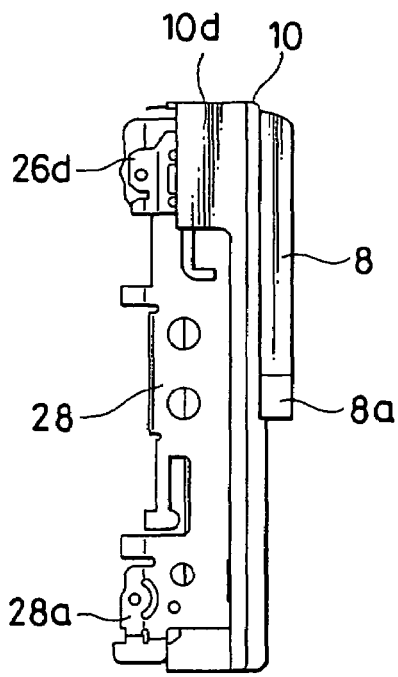
Figure 29B:
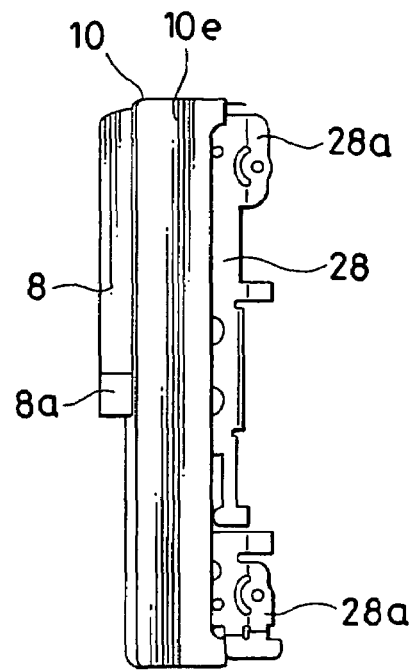
Figure 30:
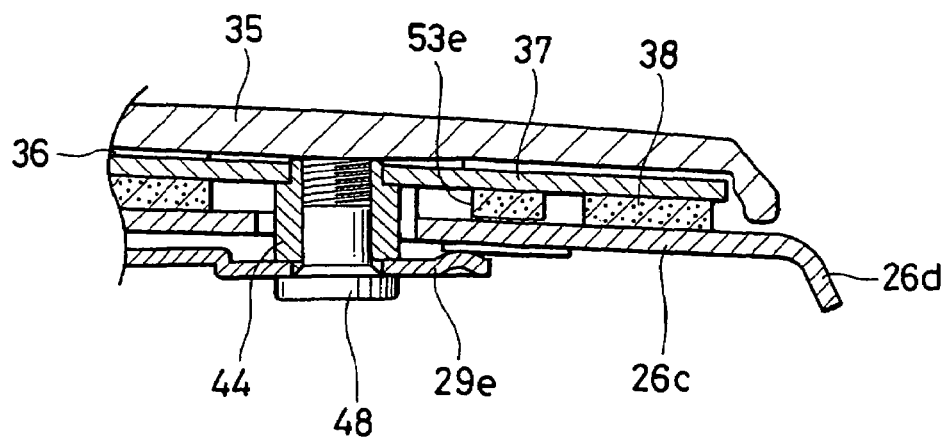
FIG. 30 is a sectional view showing the enlarged E-E line part in FIG. 24.
Figure 32A:
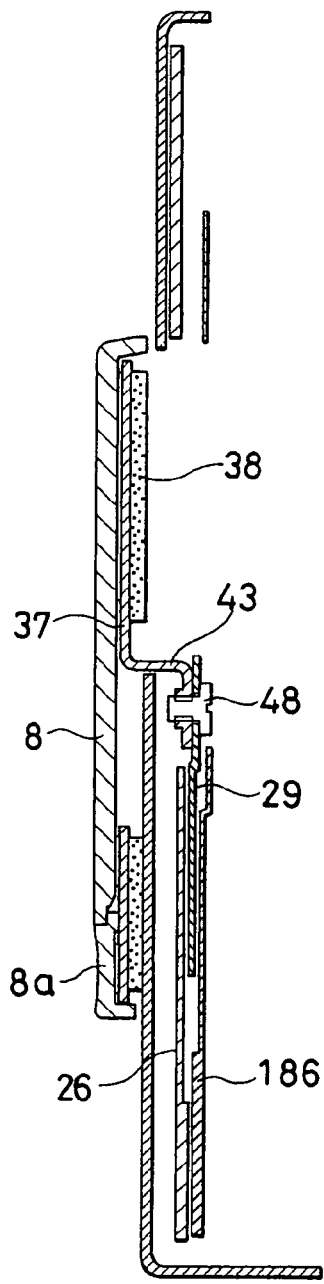
Figure 32B:
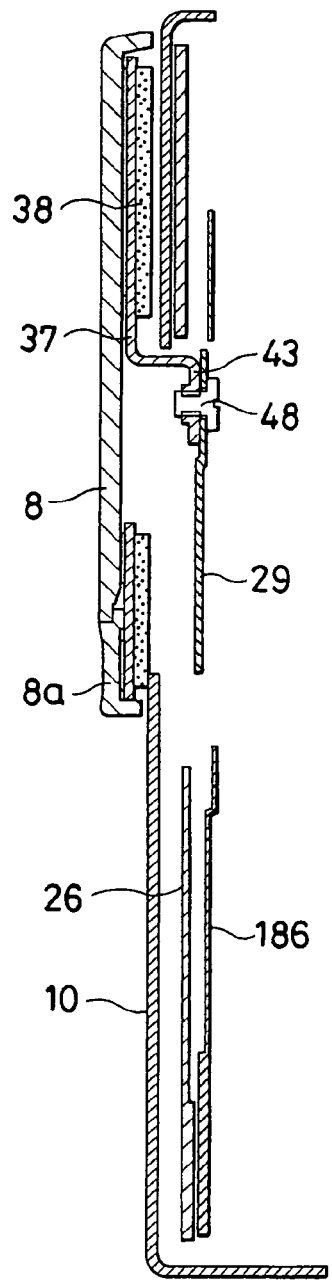
Figure 32C:
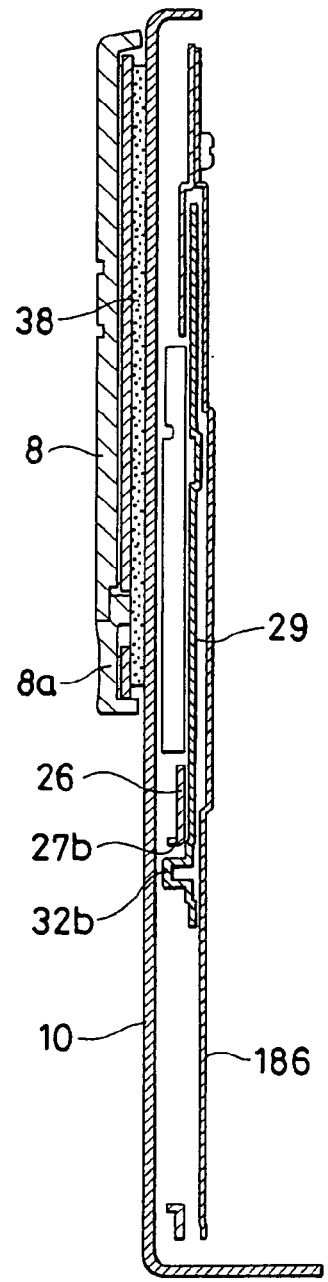
Figure 33A:
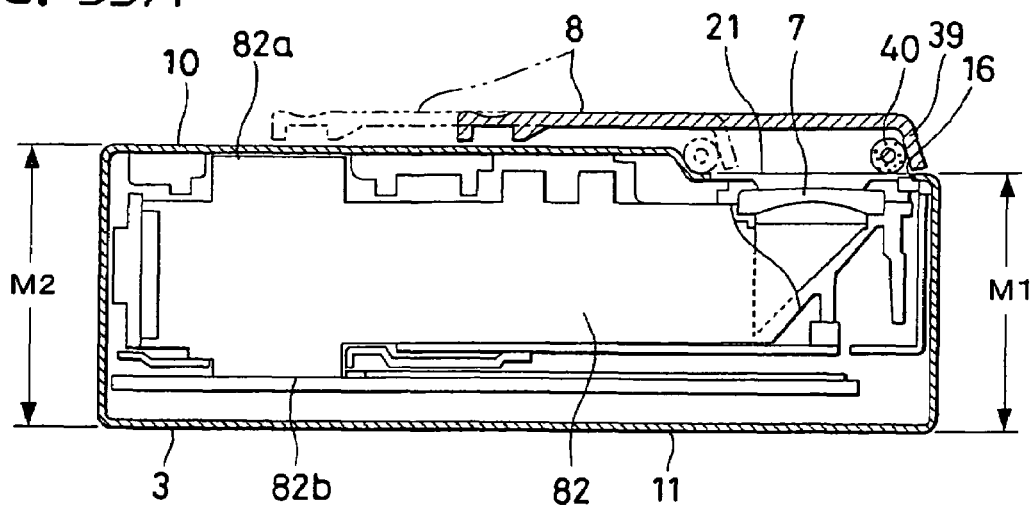
Figure 33B:
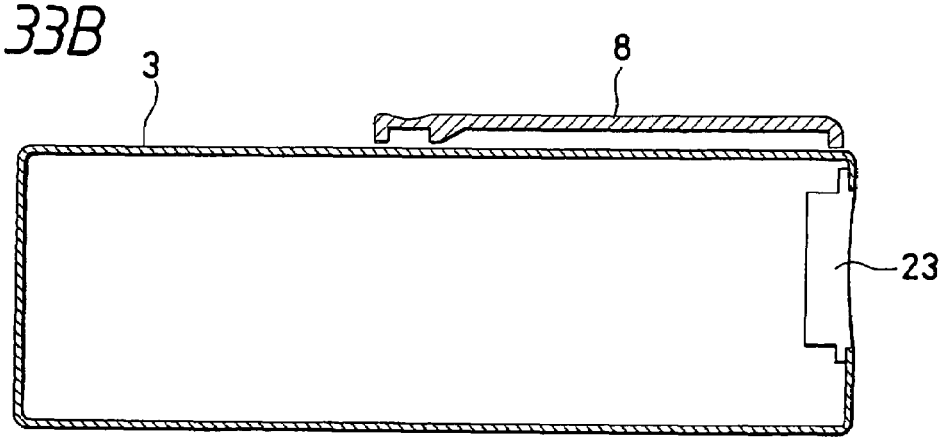
Figure 33C:
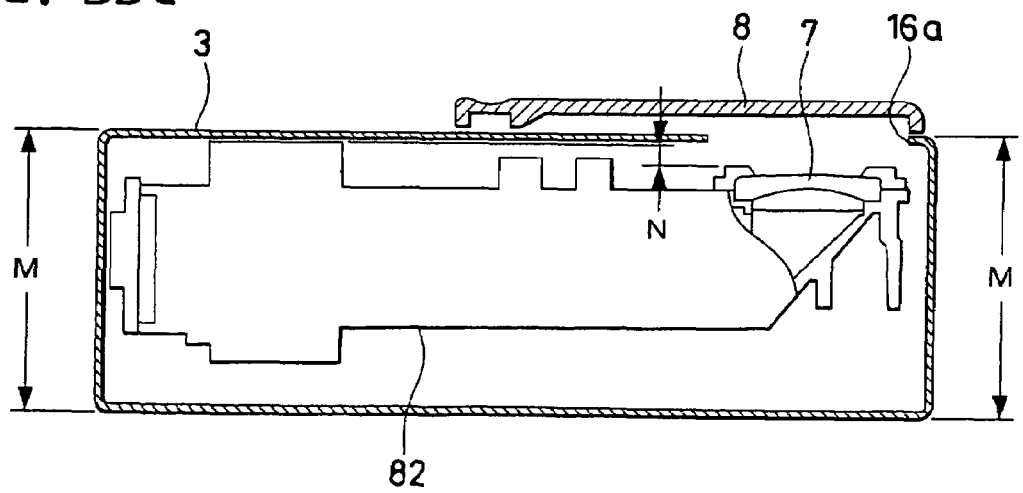

FIG. 21 is a perspective view showing a first example of an arm member relating to an imager apparatus according to an embodiment of the present invention. FIG. 22 is a perspective view of a guide member. FIG. 23 is a rear view showing a state in which a guide member is attached to a front case. FIG. 24 is a rear view showing a state in which an arm member is further attached. FIG. 25 is a perspective view showing a state in which an imaging lens opening hole is opened. FIG. 26 is a perspective view showing a state in which an imaging lens opening hole is closed. FIG. 27 is a plan view of a front case. FIG. 28 is a bottom view of a front case. FIGS. 29A and 29B are left and right side views. FIG. 30 is an E-E line sectional view of FIG. 24. FIGS. 31A and 31B are explanatory diagrams of a lens cover and the like shown in cross section as regards the part of an imaging lens. FIGS. 32A, 32B and 32C are explanatory diagrams of a lens cover and the like shown in cross section as regards the part of a bracket of a lens cover. FIGS. 33A, 33B and 33C are explanatory diagrams of the shape of a front case.

FIGS. 1 to 8 show a digital still camera 1 that is a first embodiment of an imager apparatus according to the present invention. The digital still camera 1 uses a semiconductor recording medium as an information recording medium. Using a CCD (solid-state imaging device), an optical image obtained from a subject is converted to an electric signal to be recorded in the semiconductor recording medium and to be displayed on a flat display panel 2 that is a display apparatus such as a liquid crystal display.

As shown in FIG. 1 and other figures, the digital still camera 1 includes: a housing 3, a lens device 5, a flat display panel 2, a control device 6, a lens cover 8, a battery power source not shown in the drawings and the like. The lens device 5 captures an image of a subject as light to be sent to a CCD 4 serving as an imager. The flat display panel 2 is a display apparatus including a liquid crystal display and the like that displays an image based upon an image signal output from the CCD 4. The control device 6 controls action of the lens device 5 and display of the flat display panel 2 and the like. The lens cover 8 opens and closes an imaging lens 7 of the lens device 5.

Formed of a flat container which is rectangular in shape, the housing 3 includes: a front case 10 and a rear case 11 fitted together in an anteroposterior direction, a main frame 12 which divides a space portion formed by the front and rear cases 10 and 11 into front and rear portions, and the like. The lens cover 8 is attached to the front surface of the front case 10 in a slidable manner in an up-and-down direction.

As shown in FIGS. 16, 17 and other figures, the front case 10 is formed of approximately a rectangular shallow container extending in lateral direction. Specifically, the front case 10 has approximately a rectangular front surface portion 10a, an upper surface portion 10b and a lower surface portion 10c being continuous with the top and bottom of the front surface portion 10a respectively, being erected by 90 degrees. Further, the front case 10 has left and right side surface portions 10d and 10e being continuous with the left and right of the front surface portion 10a, with the top and bottom of the lower surface portion 10c, being erected by 90 degrees. In the front surface portion 10a of the front case 10 are provided a plurality of (four in the present embodiment) opening portions 14a, 14b, 14c and 14d extending in the up-and-down direction. The four opening portions 14a to 14d are disposed at appropriate intervals in the left-and-right direction approximately in the middle of the front surface portion 10a in the up-and-down direction.

Further, at the side of the opening portions 14a to 14d in the front surface portion 10a of the front case 10 are provided projecting portions 15a, 15b, 15c and 15d extending in the up-and-down direction. The projecting portions 15a to 15d are provided to support members on the side of the lens cover 8, thereby preventing the surface of the front surface portion 10a from being scratched by the members on the lens cover 8. Each of the projecting portions 15a to 15d is formed of an arc-shaped protruding portion, the top part of which is linearly contacted by the members on the lens cover 8 in a slidable manner. Further, the front surface portion 10a of the front case 10 is formed as a cylindrical curved surface by making a middle part thereof in a lateral direction slightly protrude in the form of an arc.

In an upper-right part of the front surface portion 10a of the front case 10 are provided: a lens opening hole 16 for exposing the imaging lens 7 of the lens device 5, a flash opening hole 18 for exposing a light-emitting portion 17a of a flash apparatus 17, an opening hole 19 for exposing light-emitting/light-receiving portions of an autofocus mechanism and a roller opening hole 20 for passing a later-mentioned supporting roller. The lens opening hole 16 is set in the vicinity of the upper-right corner of the front surface portion 10a, and on the inner side thereof are arranged the flash opening hole 18, opening hole 19 and roller opening hole 20 in this order as seen from above, in such a manner as to surround the peripheral edge of the lens opening hole 16. In relation to these opening holes 16, 18, 19 and 20, a stepped portion 21 whose surface is one step lower than the surface of the other parts is provided at the upper-right part of the front surface portion 10a.

The stepped portion 21 of the front surface portion 10a of the front case 10 is provided corresponding to the shape on the side of the imaging lens 7 of the lens device 5. The stepped portion 21, whose size corresponds to a transfer amount of the lens cover 8 and the size of the light-emitting portion 17a, is formed as a recess approximately rectangular in shape extending in a lateral direction. On the bottom surface portion of the stepped portion 21 are provided the whole of the lens opening hole 16, the whole of the opening hole 19, and the most of the flash opening hole 18. On slanting slope portions 21a and 21b, which is continuous from the surface of the front surface portion 10a to the bottom surface portion of the stepped portion 21, are provided a part of the flash opening hole 18 and the whole of the roller opening hole 20. Further, the upper part of the first opening portion 14a and the upper part of the second opening portion 14b reach the slope portion 21b of the stepped portion 21, and a notch 14e for passing through a supporting roller is provided at the upper part of the first opening portion 14a.

In the upper surface portion 10b of the front case 10 is provided an upper notch portion 24a which has been cut away in the form of an arc to hold a switch holder 23. Further, in the lower surface portion 10c are provided a first lower notch portion 24b for exposing a tripod screw hole and a second lower notch portion 24c for exposing a connector electrically connected to an external electronic apparatus or the like. In addition, in the left side surface portion 10 d is provided a lateral notch portion 24d engaged with a lid that opens and closes a battery storage portion where a battery of a power source is stored.

A guide member 26 is fixed to the inner surface of the front case 10 and integrally formed. The guide member 26 has a structure shown in FIG. 22. Specifically, the guide member 26 includes: a rail portion 26a extending in the up-and-down direction, fixed portions 26b continuous with the rail portion 26a in the left-and-right direction being formed in several positions, and an arm portion 26c continuous with the upper part of the rail portion 26a, protruding in the lateral direction. Between the rail portion 26a and each fixed portion 26b is provided a level difference of suitable size, thereby raising the rail portion 26a to a predetermined height and setting a gap between the rail portion 26a and the front case 10.

The rail portion 26a of the guide member 26 is provided with two guide grooves 27a and 27b extending in the up-and-down direction at a predetermined interval in the up-and-down direction. The two guide grooves 27a and 27b are parallel to each other and are arranged being slightly shifted in the left-and-right direction. Further, as shown in FIGS. 17, 27 and 28, the tip of the arm portion 26c protrudes backward passing beyond the left side surface portion 10 d of the front case 10, and an engagement piece 26d on the left side is formed by the protruding portion. A joint plate 28 extending in the up-and-down direction is fixed to the right side surface portion 10e of the front case 10, corresponding to the engagement piece 26d.

Engagement pieces 28a are each provided at both ends of the joint plate 28 in the lengthwise direction. The rear case 11 is engaged with the front case 10 in a detachable manner by means of the two right engagement pieces 28a and 28a and the left engagement piece 26d. Thus, the front case 10 and the rear case 11 are assembled in a detachable manner by fastening and fixing each engagement portion with a fastening mechanism of fixing screws.

An arm member 29 is engaged with the guide member 26 fixed to the inner surface of the front case 10 in a slidable manner in the up-and-down direction. The arm member 29 has a structure shown in FIG. 21. Specifically, the arm member 29 includes: a fixed portion 29a, a first arm portion 29b, a second arm portion 29c, a forcing piece 29d and an auxiliary arm portion 29e. The fixed portion 29a is fixed to the lens cover 8. The first arm portion 29b is continuous with the fixed portion 29a and extends upward. The second arm portion 29c is continuous with the fixed portion 29a and extends downward. The forcing piece 29d is similarly continuous with the fixed portion 29a and extends downward. The auxiliary arm portion 29e extends in a direction perpendicular to the direction in which the two arm portions 29b and 29c extend.

In the fixed portion 29a of the arm member 29 are provided two insertion holes 30a and 30b through which fixing screws are inserted and a retainer hole 31 to which one end of a torsion spring is retained. The two insertion holes 30a and 30b are provided with a predetermined interval in between in the lateral direction, and the retainer hole 31 is arranged on the outer side of the first insertion hole 30a. At the tip of the first arm portion 29b of the arm member 29 is provided a first engagement pin 32a protruding toward the side of a surface, and at the tip of the second arm portion 29c is similarly provided a second engagement pin 32b protruding toward the side of a surface. The length T of the first engagement pin 32a and the second engagement pin 32b in the direction in which the lens cover 8 moves is set greater than the length (height) H of the lens cover 8 in that moving direction.

The forcing piece 29d of the arm member 29 generates spring force with which the arm member 29 is forced toward the guide member 26. At the tip of the forcing piece 29d is provided a pressed portion 33 sliding in contact with members on the main frame 12. Further, at the end of the auxiliary arm portion 29e is provided a third insertion hole 30c through which a fixing screw is inserted. Arranged on the inner side of the front case 10, the arm member 29 with such structure is joined to the lens cover 8 at the arranged position to be slidable integrally with the lens cover 8.

A metal such as stainless steel is suitable for a material of the front case 10, later-mentioned rear case 11, guide member 26 and arm member 29, for example. It should be appreciated that other metals can also be used, and engineering plastic and the like can be used as well. Particularly, regarding the arm member 29 a leaf spring having excellent spring characteristic is preferably used as an embodiment.

The lens cover 8 has a structure shown in FIGS. 3, 31, 32 and other figures. Specifically, the lens cover 8 includes: a decorative plate 35, an adhesive sheet 36, a frame 37, a wiping member 38 and the like. Formed of a rectangular flat plate, the decorative plate 35 includes: approximately a rectangular front surface portion 35a, and a frame portion 35b surrounding the four sides of the front surface portion 35a. Further, at the lower side of the front surface portion 35a is provided a skirt-like control portion 8a continuous in the lengthwise direction. As shown in FIGS. 4 and 5, the control portion 8a of the decorative plate 35 has the function of enhancing ornamental quality and has the function of serving as a knob or handle for sliding the lens cover 8.

In the upper side of the frame portion 35b of the decorative plate 35 is provided a peaked portion 39 which eliminates a gap between the decorative plate 35 and the front case 10 by protruding toward the stepped portion 21. The peaked portion 39 has the shape corresponding to the shape of the stepped portion 21 of the front case 10. Specifically, the peaked portion 39 is shaped such that while the lens cover 8 moves from a first position that covers the imaging lens 7 to a second position that opens the imaging lens 7, the peaked portion 39 moves along inside the stepped portion 21, and thus the peaked portion 39 eliminates a gap between the lens cover 8 and the stepped portion 21 of the front case 10.

Further, as shown in FIGS. 3, 18 and other figures, two supporting rollers 40 and 40 are supported in a freely rotatable manner on the inner side of the peaked portion 39 of the decorative plate 35. The two supporting rollers 40 and 40 are provided to prevent the lens cover 8 from falling at the stepped portion 21 of the front case 10 and have the function of preventing change in the posture of the lens cover 8 by rolling in contact with the bottom surface portion of the stepped portion 21. The two supporting rollers 40 and 40 are provided in a symmetrical manner with the lens opening hole 16 in between. Each supporting roller 40 has a turning shaft portion which penetrates through the center part with a bearing portion 41, which supports both ends of the turning shaft portion in a freely turnable manner, being provided on the decorative plate 35.

An engineering plastic is suitable for the material of the decorative plate 35 having such structure in terms of weight reduction. However, it should be appreciated that aluminum alloy and other metal materials can also be used. The frame 37 and the wiping member 38 are stored in the back of the front surface portion 35a and inside the frame portion 35b of the decorative plate 35. The frame 37 of the lens cover 8 is fastened to the back surface of the decorative plate 35 by means of the adhesive sheet 36 to be integrally formed.

As shown in FIGS. 3, 18 and other figures, the frame 37 is formed of approximately a rectangular plate slightly smaller than the front surface portion 35a of the decorative plate 35, and approximately in the middle in the height direction are provided three bracket pieces 43a, 43b and 43c and one bracket convex portion 44 showing a specific example of brackets. The bracket pieces 43a to 43c and the bracket convex portion 44 are provided at intervals approximately similar to those regarding the four opening portions 14a to 14d provided in the front case 10. The three bracket pieces 43a to 43c are formed by notching the frame 37 in U-shape in predetermined positions and by bending the inner parts thereof into L-shape to be erected. Further, the bracket convex portion 44 is formed by providing a shaft-like convex portion in an upright position on the inner surface of the frame 37.

A screw hole 45 is provided at the tip surfaces of the three bracket pieces 43a to 43c and the end surface of the bracket convex portion 44. At the time of assembly, these three bracket pieces 43a to 43c and the bracket convex portion 44 are inserted into the corresponding four opening portions 14a to 14d in the front case 10 respectively, and each end part protrudes toward the inner side of the front case 10. As shown in FIGS. 24 to 26, a fastening plate 47 is fixed to the first bracket piece 43a by means of a fixing screw 48. Also, the fixed portion 29a of the arm member 29 is fixed to the second bracket piece 43b and the third bracket piece 43c by means of fixing screws 48. Further, as shown in FIG. 30, the auxiliary arm portion 29e is fixed to the bracket convex portion 44 by means of a fixing screw 48.

Hereupon, the first engagement pin 32a provided at the first arm portion 29b of the arm member 29 is engaged with the first guide groove 27a of the guide member 26 held on the inner side of the front case 10 in a slidable manner. Further, the second engagement pin 32b provided at the second arm portion 29c of the arm member 29 is engaged with the second guide groove 27b of the guide member 26 in a slidable manner. Further, a resilient piece on one side of a torsion spring 49 is locked in the retainer hole 31 of the arm portion 29b. A resilient piece on the other side of the torsion spring 49 is locked on a spring receiving pin 51 erected on the inner surface of the front case 10. The torsion spring 49 has the function of giving a clicking feeling to the sliding motion of the lens cover 8, and applying toggle force at the end of the motion.

Four sliding sheets 52 are provided on the surface of the frame 37, where the bracket pieces 43a to 43c and the bracket convex portion 44 protrude, in the vicinity of those brackets. Extended in the up-and-down direction, the four sliding sheets 52 are fixed to the frame 37 by a fastening mechanism such as adhesive. The four sliding sheets 52 are provided in positions corresponding to the four projecting portions 15a to 15d provided in the front surface portion 10a of the front case 10. PET (polyethylene terephthalate) sheets are suitable for the material of the sliding sheets 52, for example, however, the material is not limited thereto, provided that skin friction resistance is low.

Thus, when the lens cover 8 is moved, the projecting portions 15a to 15d linearly slide in contact with the sliding sheets 52, thereby reducing friction resistance and preventing the surface of the front case 10 from being scratched. On the surface of the frame 37, where the bracket pieces 43a to 43c and the like protrude, is fixed the wiping sheet 38 by a fastening mechanism such as adhesive.

The wiping sheet 38 is brought in soft contact with the surface of the front case 10 to wipe off foreign particles, dust and the like on the surface thereof. The wiping sheet 38 has outer shape approximately similar to the frame 37, however, inside the wiping sheet 38 are provided through-holes 53a, 53b, 53c, 53d and 53e for exposing the bracket pieces 43a to 43c and the bracket convex portion 44 of the frame 37 and the sliding sheets 52. Accordingly, the whole surface of the wiping sheet 38 is in contact with the surface of the front case 10, while passing through necessary brackets and the like and exposing the sliding sheets 52. Therefore, when the lens cover 8 is in sliding motion, the front case 10 is wiped by the whole surface of the wiping sheet 38.

The two engagement pins 32a and 32b and the two guide grooves 27a and 27b, which have been mentioned earlier, constitute a slide joining mechanism which joins the arm member 29 and the guide member 26 in a slidable manner. In this embodiment, an example is explained in which the arm member 29 is provided with the two engagement pins 32a and 32b, and the guide member 26 is provided with the two guide grooves 27a and 27b. However, it should be appreciated that the arm member 29 may be provided with guide grooves, and the guide member 26 may be provided with engagement pins. Further, the number of engagement pins and guide grooves provided may be one each, and may be three or more each. Furthermore, the three bracket pieces 43a to 43c and the bracket convex portion 44, the opening portions 14a to 14d provided in the front case 10, the arm member 29 and the guide member 26, and the slide joining mechanism, which have been mentioned earlier, constitute a cover moving mechanism.

Thus, as shown in FIGS. 4, 20, 24 and 26, when the lens cover 8 is in the first position on the upper side, the imaging lens 7 is completely closed, thereby protecting the imaging lens 7. On the other hand, as shown in FIGS. 5, 19 and 25, when the lens cover 8 is moved to the second position on the lower side, the imaging lens 7 is completely exposed and the power switch is turned on, enabling shooting.

As shown in FIGS. 1, 6 and 8, a square opening window 61 for exposing the display surface of the flat display panel 2, which is a display apparatus, is provided in the rear case 11. A large opening is made in the back surface of the rear case 11 to provide the opening window 61, and the flat display panel 2 is arranged therein. The flat display panel 2 includes a liquid crystal display having a size corresponding to the opening window 61 and a back light fitted onto the inner surface of the liquid crystal display. A protection board 63 is arranged on the display surface side of the flat display panel 2 with a seal frame 62 in between, and the peripheral edge of the protection board 63 is in contact with the inner surface of the opening window 61. Further, as shown in FIG. 2, an LCD frame 64 which holds the flat display panel 2 is arranged on the back surface side of the flat display panel 2.

Further, various operational switches are provided in the rear case 11. In appropriate positions are arranged: a mode selection knob 65, a zoom button 66, a screen display button 67, a menu button 68, a direction key 69, a screen button 70 and the like. The mode selection knob 65 selects a function mode (still image, moving image, playback and the like). The zoom button 66 performs zooming operation. The screen display button 67 performs screen display. The menu button 68 selects various menus. The direction key 69 moves a menu-selecting cursor and the like. The screen button 70 switches screen sizes and delete a screen. Further, a loudspeaker hole 71 with a loudspeaker being incorporated inside is made at an end on the side of the flat display panel 2 of the rear case 11. Also, a supporting metal piece 72 for a strap is attached to an end on the side opposite to the loudspeaker hole 71 of the rear case 11.

The lens device 5, with the CCD 4 being arranged below and an optical axis L extending in the up-and-down direction, is stored in one side portion on the front surface of the main frame 12 dividing the space between the rear case 11 and the front case 10. Further, to the main frame 12 are attached: the control device 6 prepared by mounting a predetermined microcomputer, resistance, capacitor, other electronic components and the like on a printed circuit board; a flash apparatus 74 and the like.

The control device 6 is arranged side by side with the lens device 5, and the flash apparatus 74 is arranged above these. The flash apparatus 74 includes: a light-emitting portion 74a exposed on the front surface of the front case 10, a driving unit 74b which drives the light-emitting portion 74a to be controlled, a capacitor 74c which supplies predetermined electric power to the driving unit 74b, and the like. The light-emitting portion 74a of the flash apparatus 74 and the imaging lens 7 of the lens device 5 are fitted into the lens opening hole 16 and the flash opening hole 18 respectively, provided in corresponding positions in the front case 10.

Further, as shown in FIGS. 4, 5, 7 and other figures, on the upper surface of the housing 3 are provided: a power button 75 to turn on/off power, a shooting button 76 to start and end shooting, a camera shake correction control button 77 to stabilize an image by operating an image stabilizer of the lens device 5 when a camera shake occurs, and the like. Further, a microphone hole 78 is prepared approximately at the center of the upper surface of the housing 3 with a microphone being incorporated inside. The power button 75, shooting button 76 and camera shake correction control button 77 are all attached to a switch holder 79 installed on the housing 3. Further, the microphone hole 78 is also made in the switch holder 79, and the built-in microphone is fixed to this switch holder 79.

As shown in FIGS. 1, 3, 9 to 15, the lens device 5 relating to an imager apparatus according to an embodiment of the present invention includes: a lens system 81, a lens barrel 82, a CCD (solid-state imaging device) 4, an image stabilizer 83 and the like. The lens system 81 has five-group lenses in which a plurality of lenses are disposed on the same optical axis L. The lens barrel 82 supports the lenses of this lens system 81 in a fixed or movable manner. The CCD (solid-state imaging device) 4 is a specific example of an imager arranged on the optical axis L of the lens system 81 and fixed to the lens barrel 82. The image stabilizer 83 is attached to the lens barrel 82 and stabilizes images of the lens system 81.

As shown in FIG. 13, the lens system 81 of the lens device 5 is constructed as a collapsible lens having five-group lenses 85 to 89 in which five lens groups are disposed on the same optical axis L. Of the five-group lenses 85 to 89, the first-group lens 85 positioned at the end includes: a first lens 7 which is an imaging lens facing a subject; a prism 85A which is arranged opposing a subject of this imaging lens 7; and a second lens 85B which faces this prism 85A. The prism 85A is formed of a triangular prism whose cross section is shaped to be an isosceles right triangle; one of the two sides which are adjacent to each other and rotationally displaced by 90° is faced by the imaging lens 7, and the other side is faced by the second lens 85B.

As regards this first-group lens 85, light passing through the imaging lens 7 enters the prism 85A from one surface. The light is then reflected on a reflection surface inclined 450 with respect to the optical axis L and so is made to advance in a direction that is bent by 90°. Subsequently, the light passes through the second lens 85B after being emitted from the other surface; and eventually advances toward the second-group lens 86 along the optical axis L. The second-group lens 86 is a combination of a third lens 86A and fourth lens 86B, and is constructed in such a manner as to be movable on the optical axis L. Light passing through the second-group lens 86 enters a third-group lens 87.

The third-group lens 87 is formed of a fifth lens fixed to the lens barrel 82. Behind the third-group lens 87 is arranged the fourth-group lens 88 formed of a sixth lens. Between the fourth-group lens 88 and the third-group lens 87 is arranged an iris mechanism 90 capable of adjusting the amount of light which passes through the lens system 81. The fourth-group lens 88 is constructed in such a manner as to be movable on the optical axis L. Behind the fourth-group lens 88 is arranged the fifth-group lens 89 formed of a seventh lens 89A and a correcting lens 89B described later on. Of the components of the fifth-group lens 89, the seventh lens 89A is fixed to the lens barrel 82, the correcting lens 89B is arranged behind this seventh lens 89A in a movable manner, and further, the CCD 4 is arranged behind the correcting lens 89B.

The second-group lens 86 and the fourth-group lens 88 are movable in an optical axis direction independently and separately along the optical axis L. By moving the second-group lens 86 and the fourth-group lens 88 in predetermined directions, zoom adjustment and focus adjustment can be performed. Specifically, at the time of zooming, by moving the second-group lens 86 and the fourth-group lens 88 from wide to telephoto, zoom adjustment is carried out. Also, at the time of focusing, by moving the fourth-group lens 88 from wide to telephoto, focus adjustment can be carried out.

The CCD 4 is fixed to a CCD adaptor and is attached to the lens barrel 82 by means of this CCD adaptor. In front of the CCD 4 is arranged an optical filter 91, and between this optical filter 91 and the seventh lens 89A is arranged the image stabilizer 83 having the correcting lens 89B. The image stabilizer 83 that is explained later on stabilizes picked-up images blurred by vibration of the lens system 81 or the like. In its normal state, the correcting lens 89B is installed such that the optical axis thereof coincides with the optical axis L of the lens system 81. And when an image is blurred on the focusing screen of the CCD 4 owing to vibration of a camera body or the like, the image blurred on the focusing screen is stabilized by the image stabilizer 83 which moves the correcting lens 89B in two directions (a first direction X and a second direction Y) perpendicular to the optical axis L.

As shown in FIGS. 9 to 12 and 14, the lens barrel 82 holding the lens system 81 with the above-described structure includes: an upper barrel 93, a middle barrel 94 and a lower barrel 95 which are combined and assembled by arranging one on top of the other in an up-and-down direction. The upper barrel 93 is formed of a housing having an opening window 96 provided in the upper part at the front and an opening portion provided in its lower surface. To the opening window 96 is attached the imaging lens 7 of the first-group lens 85, and by means of a decorative plate 97 attached to the front surface thereof, the imaging lens 7 is attached to the upper barrel 93. Inside the upper barrel 93 are fixed the prism 85A arranged on the rear surface of the imaging lens 7 with a light-shielding plate 98 in between, and the second lens 85B arranged on the lower surface of this prism 85A.

Inside the upper barrel 93 is supported a first movable holding frame 101 in a movable manner in the direction parallel with the optical axis L of the lens system 81 extended in the up-and-down direction of the lens barrel 82. In the first movable holding frame 101 is provided a through-hole which penetrates in the up-and-down direction, and the second-group lens 86 is fixed to the through-hole. The first movable holding frame 101 is constructed to be movable back and forth in the direction of the optical axis L of the lens system 81 within a predetermined range, by means of a zoom driving mechanism 102 attached to the upper barrel 93.

The zoom driving mechanism 102 includes: a zoom motor 103, a feed screw shaft 104 provided as a rotary shaft of this zoom motor 103, a feed nut 105 which engages with this feed screw shaft 104, and the like. The zoom motor 103 is fixed to a first bracket 106 which is U-shaped, and both ends of the feed screw shaft 104 protruding into one end thereof are supported in a freely turnable manner by the first bracket 106. The first bracket 106 is attached to the upper barrel 93 by means of a plurality of (two in the present embodiment) fixing screws 107 showing a specific example of a fastening mechanism.

In the installed state of the first bracket 106, the feed nut 105 engages with the feed screw shaft 104 in a slidable manner. The feed nut 105 is held by the first movable holding frame 101, with its movement restricted as regards the direction in which its screw grooves extend. Further, two guide shafts 108a and 108b penetrate into the first movable holding frame 101 in a direction parallel with the optical axis L in a slidable manner. Ends of both the guide shafts 108a and 108b on one side are held by the upper barrel 93, and ends thereof on the other side are held by the middle barrel 94.

Thus, when the zoom motor 103 is driven, the rotating force of the feed screw shaft 104 is transmitted to the first movable holding frame 101 via the feed nut 105. At that time, the feed nut 105 is relatively moved in the axial direction with respect to the feed screw shaft 104 driven and rotating in a predetermined position. As a result, the first movable holding frame 101 moves in combination with the feed nut 105, thereby making the second-group lens 86 selectively move either in a direction approaching the first-group lens 85 or in a direction approaching the third-group lens 87, in accordance with the rotating direction of the zoom motor 103. On this occasion, the first movable holding frame 101 holding the second-group lens 86 is guided in the direction parallel with the optical axis L by the two guide shafts 108a and 108b, and therefore can be moved on the optical axis L with accuracy.

The iris mechanism 90 arranged below the third-group lens 87 fixed to and held by the middle barrel 94 includes: a blade member 111 which freely adjusts the area of an aperture, a blade pressing plate 112 which supports this blade member 111 in a movable manner, a step motor 113 which opens and closes the blade member 111, and the like. The step motor 113 is fixed to the side of the upper surface of the middle barrel 94, with a motor base 114 arranged in between. The lower barrel 95 is fitted under the middle barrel 94, and the upper barrel 93 is fitted onto the middle barrel 94; these three barrels are fastened and fixed by a plurality of (three in the present embodiment) fixing screws 115 which penetrate these in the up-and-down direction, and so assembled in combination, thereby constituting the lens barrel 82.

The lower barrel 95 is formed of a housing which has openings in its upper surface, side surface and lower surface, and inside the housing is supported a second movable holding frame 116 in a movable manner in an up-and-down direction which is parallel with the optical axis L of the lens system 81. In the second movable holding frame 116 is provided a through-hole which penetrates in the up-and-down direction, and the fourth-group lens 88 is fixed to the through-hole. The second movable holding frame 116 is constructed to be movable back and forth in the direction of the optical axis L of the lens system 81 within a predetermined range, by means of a focus driving mechanism 117 attached to the lower barrel 95.

The focus driving mechanism 117 includes: a focusing motor 118, a feed screw shaft 119 provided as a rotary shaft of this focusing motor 118, a feed nut 120 which engages with this feed screw shaft 119, and the like. The focusing motor 118 is fixed to a second bracket 121 which is U-shaped, and both ends of the feed screw shaft 119 protruding into one end thereof are supported in a freely turnable manner by the second bracket 121. The second bracket 121 is attached to the lower barrel 95 by means of a plurality of (two in the present embodiment) fixing screws 122 being a fastening mechanism.

In the installed state of the second bracket 121, the feed nut 120 engages with the feed screw shaft 119 in a slidable manner. The feed nut 120 is held by the second movable holding frame 116, with its movement restricted as regards the direction in which its screw grooves extend. Further, two guide shafts 123 (only one of which is shown in FIG. 11) penetrate into the second movable holding frame 116 in a direction parallel with the optical axis L in a slidable manner. Ends of the two guide shafts 123 on one side are held by the middle barrel 94, and ends thereof on the other are held by the lower barrel 95.

Thus, when the focusing motor 118 is driven, the rotating force of the feed screw shaft 119 is transmitted to the second movable holding frame 116 via the feed nut 120. At that time, the feed nut 120 is relatively moved in the axial direction with respect to the feed screw shaft 119 driven and rotating in a predetermined position. As a result, the second movable holding frame 116 moves in combination with the feed nut 120, thereby making the fourth-group lens 88 selectively move either in a direction which approaching the third-group lens 87 or in a direction approaching the fifth-group lens 89, in accordance with the rotation direction of the focusing motor 118. On this occasion, the second movable holding frame 116 holding the fourth-group lens 88 is guided in the direction parallel with the optical axis L by the two guide shafts 123, and therefore can be moved on the optical axis L with accuracy.

The CCD 4 is attached to the lower surface of the lower barrel 95 by means of a CCD adaptor 125. The CCD adaptor 125 is formed of a board which has a square opening hole in the middle, and to one surface thereof is integrally fixed the CCD 4 by a fastening mechanism such as adhesive through a seal rubber 126 which is shaped like a square frame. On the other surface of the CCD adaptor 125 is arranged a light-shielding plate 127 in which optical filters 91 are stacked on top of each other, and these are fixed, being pressed by a filter pressing plate 128. And, with the optical filters 91 arranged inside, the CCD adaptor 125 is attached to the lower barrel 95 by a fastening mechanism such as fixing screws.

In an opening portion 130 made in a side surface of the lower barrel 95 is installed the image stabilizer 83 in a detachable manner. The image stabilizer 83 has a structure shown in FIGS. 14 and 15. The image stabilizer 83 includes: the above-mentioned correcting lens 89B, a first moving frame 131, a second moving frame 132, a fixed base board 133, an actuator 134, a position detector and the like. The first moving frame 131 supports the correcting lens 89B. The second moving frame 132 supports the first moving frame 131 in a movable manner in a first direction X perpendicular to the optical axis L of the lens system 81. The fixed base board 133 supports the second moving frame 132 in a movable manner in a second direction Y perpendicular to the optical axis L and perpendicular to the first direction X. The actuator 134 showing a specific example of a driver moves the first moving frame 131 in the first direction X and moves the second moving frame 132 in the second direction Y. The position detector detects the position of the correcting lens 89B.

When vibration or shake of the hands is given to the housing 3 of the above-described digital still camera 1, the correcting lens 893 stabilizes an image blurred by its position being moved in the first direction X and/or second direction Y corresponding to the image blur amount at that time. This correcting lens 89B is fixed to the first moving frame 131. The first moving frame 131 includes: a ring-shaped lens fixed portion 131a into which the correcting lens 89B is fitted, a yoke fixed portion 131b which is formed continuously to one side of this lens fixed portion 131a, being folded into the form of a crank and to which a yoke 136 is fixed, and the like.

The lens fixed portion 131a has a shape corresponding to the shape of the correcting lens 89B, and a stepped portion which engages with the stepped portion 15a of the correcting lens 89B and two-surface width portions which correspond to the two-surface width portions of the correcting lens 89B are provided on the peripheral edge of a fitting hole into which the correcting lens 89B is fitted. On the outside of the two-surface width portions of the lens fixed portion 131a are provided a first main bearing portion 141 and first sub bearing portion 142. The first main bearing portion 141 has two bearing pieces provided with a predetermined amount of space in between in the first direction X, and a first main guide shaft 143 penetrates into both bearing pieces in the first direction X. The first main guide shaft 143 is fixed to both the bearing pieces in a press-fit manner, and both the ends thereof protrude from the bearing pieces to the outside.

The first sub bearing portion 142 is provided with a bearing groove made on its side, and a first sub guide shaft 144 engages with the bearing groove in a slidable manner. Also, the yoke 136 constituting a part of the actuator 134 is fixed to the yoke fixed portion 131b of the first moving frame 131 by a fastening mechanism such as adhesive or fixing screws. The yoke 136 includes: an upper piece and a lower piece, which are parallel and opposed to each other with a predetermined amount of space in between, and a joint piece, which joins the upper and lower pieces together. To the inner surfaces of the upper and lower pieces of the yoke 136 are fixed flat magnets 137 and 137 which are formed into the shape of rectangles having approximately the same size as the inner surfaces, by a fastening mechanism such as adhesive.

These two magnets 137 and 137 vertically opposed to each other and the yoke 136 constitute a magnetic circuit for the actuator 134. Specifically, one magnetic circuit member having one yoke 136 and two magnets 137 and 137 serves as a magnetic circuit for a first driver and a magnetic circuit for a second driver.

The second moving frame 132 is formed of a flat plate slightly wider than the first moving frame 131. The second moving frame 132 is assembled facing the first moving frame 131 in such a manner as to fit under it. At the position of the second moving frame 132 corresponding to the fitting hole of the first moving frame 131 is provided a through-hole which has approximately the same size as the fitting hole. On the upper surface of the second moving frame 132 is provided a second bearing portion for supporting the first moving frame 131 in a slidable manner in the first direction X.

The second bearing portion includes: a second main bearing portion 145 which supports the first main guide shaft 143 fixed to the first moving frame 131 in a freely slidable manner, and a second sub bearing portion 146 which supports the first sub guide shaft 144 in a fixed manner. In the state in which the first moving frame 131 has been fitted onto the second moving frame 132, the second main bearing portion 145 is provided in such a position capable of supporting both ends of the first main guide shaft 143. Specifically, the second main bearing portion 145 includes two bearing pieces which support both ends of the first main guide shaft 143, and is provided on the upper surface of the second moving frame 132 in such a manner as to protrude upward. Both ends of the first main guide shaft 143 are inserted in bearing holes of the two bearing pieces of the second main bearing portion 145 in a slidable manner.

Also, in the state in which the first moving frame 131 has been fitted onto the second moving frame 132, the second sub bearing portion 146 is provided at such a position as to correspond to the first sub bearing portion 142. Specifically, the second sub bearing portion 146 includes two bearing pieces which support both ends of the first sub guide shaft 144, and both ends of the first sub guide shaft 144 are fixed to bearing holes provided in those bearing pieces in a press-fit manner. The first sub guide shaft 144 is inserted in the bearing groove provided in the first sub bearing portion 142 of the first moving frame 131 in a freely slidable manner. The first sub guide shaft 144 and first main guide shaft 143 are so set that their shaft center lines become parallel to each other, and the first moving frame 131 is guided by both guide shafts 143 and 144 to be movable in the first direction X.

On the lower surface of the second moving frame 132 is provided a third bearing portion for supporting the second moving frame 132 in a slidable manner in the second direction Y perpendicular to the first direction X. The third bearing portion includes a third main bearing portion 147 and third sub bearing portion 148, only the main parts of which are shown in FIG. 15 and other figures. The third main bearing portion 147 is on one end of the second moving frame 132 in the first direction X, includes two bearing pieces provided a predetermined amount of space away from each other in the second direction Y, and is provided on the lower surface of the second moving frame 132 in such a manner as to protrude downward. The two bearing pieces of the third main bearing portion 147 are each provided with a bearing hole, and both ends of a second main guide shaft 151 extended in the second direction Y are inserted in those bearing holes in a slidable manner.

Also, the third sub bearing portion 148 is provided approximately at the center of the other end of the second moving frame 132 in the first direction X. The third sub bearing portion 148 is provided with a bearing groove made on its side. A second sub guide shaft 152 extending in the second direction Y perpendicular to the first direction X is engaged with the bearing groove of the third sub bearing portion 148 in a slidable manner. Both the second main guide shaft 151 and second sub guide shaft 152 are fixed to the fixed base board 133. The second moving frame 132 is assembled facing this fixed base board 133 in such a manner as to fit over it.

The fixed base board 133 includes: a moving frame supporting portion 133*a* which corresponds to the second moving frame 132 in size, a coil fixed portion 133*b* continuously formed as one body with this moving frame supporting portion 133*a*, and the like. The moving frame supporting portion 133*a* is formed of a flat plate which has approximately the same size as the second moving frame 132, and the coil fixed portion 133*b* is continuous with one end of this moving frame supporting portion 133*a* in the first direction X. At the position of the moving frame supporting portion 133*a* corresponding to the through-hole of the second moving frame 132 is provided a through-hole which has approximately the same size. A fourth bearing portion which supports the second moving frame 132 in a slidable manner in the second direction Y by means of a second guide shaft is provided at both ends of the upper surface of the moving frame supporting portion 133*a* in the first direction X.

The fourth bearing portion includes a fourth main bearing portion 153 arranged on one side in the first direction X, and a fourth sub bearing portion 154 arranged on the other side in the first direction X. The fourth main bearing portion 153 includes two bearing pieces provided with a certain amount of space away from each other in the second direction Y, and is provided on the upper surface of the moving frame supporting portion 133*a* in such a manner as to protrude upward. The two bearing pieces of the fourth main bearing portion 153 are each provided with a bearing hole, and two positions in the middle of the second main guide shaft 151 in its axial direction are pressed into those bearing holes to be fixed. Thus, both ends of the second main guide shaft 151 protrude to the outside of the two bearing pieces, respectively.

The two bearing pieces of the third main bearing portion 147 provided on the second moving frame 132 are fitted to the protruding portions at both ends of the second main guide shaft 151 in a slidable manner. The two bearing pieces of the third main bearing portion 147 are apart from each other by the distance which is the total of the length between the two bearing pieces and the length necessary for the second moving frame 132 to move in the second direction Y. Therefore, the third main bearing portion 147 of the second moving frame 132 is supported in a movable manner outside the two bearing pieces, with respect to the second main guide shaft 151 fixed to the fourth main bearing portion 153 of the fixed base board 133.

Also, the fourth sub bearing portion 154 includes two bearing pieces provided with a certain amount of space away from each other in the second direction Y, and is provided on the upper surface of the moving frame supporting portion 133*a* in such a manner as to protrude upward. The two bearing pieces of the fourth sub bearing portion 154 are each provided with a bearing hole, and the second sub guide shaft 152 is pressed into those bearing holes to be supported with both the ends thereof fixed in its axial direction. Between those two bearing pieces of the fourth sub bearing portion 154, the bearing groove of the third sub bearing portion 148 provided on the second moving frame 132 is engaged with the second sub guide shaft 152 in a slidable manner. Therefore, it is possible for the third sub bearing portion 148 to move between the two bearing pieces by a predetermined distance in the second direction Y, guided by the second sub guide shaft 152.

The coil fixed portion 133*b* of the fixed base board 133 is formed of a roughly square flat part which has a supporting wall 156 protruding upward, and the supporting wall 156 is arranged on one side in the second direction Y. A coil supporting stand 157 is fixed to the coil fixed portion 133*b*, and a coil assembly body 160 is attached to the coil supporting stand 157. The coil supporting stand 157 is provided for keeping the coil assembly body 160 at a predetermined height, and is formed as a frame whose plane is U-shaped. This coil supporting stand 157 is mounted on the coil fixed portion 133*b* to be set along the supporting wall 156, and integrally fixed to the fixed base board 133 by a fastening mechanism such as adhesive or fixing screws. On the lower surface of the fixed base board 133 is provided an attachment boss portion 133*c* for fixing this to the lens barrel 82.

The upper surface of the coil supporting stand 157 is formed as a level surface, and on the upper surface are provided two positioning convex portions 157*a* and 157*a* for deciding the position of a flexible reinforcing plate 161. The two positioning convex portions 157*a* and 157*a* are disposed with a predetermined amount of space away from each other in the second direction Y, and the flexible reinforcing plate 161 whose position has been decided by both positioning convex portions 157*a* and 157*a* is fixed on the upper surface of the coil supporting stand 157. A flexible printed circuit board 162 with predetermined electric circuits printed on its upper and lower surfaces is fixed to the flexible reinforcing plate 161 by a fastening mechanism such as adhesive tape.

A flat coil 164 wound flatly is installed on the upper surface of the flexible reinforcing plate 161, being electrically connected to a predetermined wiring pattern provided on the upper surface of the flexible printed circuit board 162. As shown in FIG. 14, the flat coil 164 is formed of two elliptical coil portions 164*a* and 164*b* disposed side by side. The two coil portions 164*a* and 164*b* are approximately equal in length in the widthwise direction, but are different in length in the lengthwise direction. The two coil portions 164*a* and 164*b* are formed by winding one coil wire around. Further, the direction in which the coil wire is wound is set such that at the time of supplying power, an electric current is made to flow in the same direction at thrust-generating portions extending straight on the long side adjacent to each other in the widthwise direction.

Regarding the flat coil 164, each of the coil portions 164*a* and 164*b* is fixed to the flexible reinforcing plate 161 by a fastening mechanism which is adhesive, with the lengthwise direction of the two coil portions 164*a* and 164*b* facing in the second direction Y. Thus, when an electric current is applied to the two coil portions 164*a* and 164*b*, magnetic force generated by the magnets 137 and 137 acts in the direction perpendicular to the flat coil 164, and so force directed in the first direction X acts on the side of the magnets 137 and 137 according to Fleming's left-hand rule.

Also, a cylindrical coil 165 is attached to the lower surface of the flexible reinforcing plate 161. Both ends of the cylindrical coil 165 are electrically connected to a predetermined wiring pattern provided on the lower surface of the flexible printed circuit board 162. The cylindrical coil 165 is provided with a rectangular space portion at its center so as to become a rectangular cylindrical body as a whole, and is formed into the shape of an angular cylinder by winding coil wire by a predetermined amount so as to have a predetermined thickness in the direction of a stack. Regarding the cylindrical coil 165, a thrust-generating portion is fixed to the flexible printed circuit board 162 by a fastening mechanism which is adhesive, with the direction in which its coil wire extends facing in the first direction X.

The lower piece of the yoke 136 and the lower magnet 137 integrally fixed thereto are inserted in the space portion at the center of the cylindrical coil 165. Thus, when an electric current is applied to the cylindrical coil 165, magnetic force generated by the magnets 137 and 137 acts in the direction perpendicular to the thrust-generating portion, and so force directed in the second direction Y acts on the side of the magnets 137 and 137 according to Fleming's left-hand rule. The flexible reinforcing plate 161, the flexible printed circuit board 162, the flat coil 164 and the cylindrical coil 165 constitute a coil assembly body 158.

Also, although not shown in the drawings, to the lower surface of the flexible reinforcing plate 161 are attached a first hall element and a second hall element, showing a specific example of a position detector for detecting the position of the correcting lens 89B. The first hall element detects the position of the correcting lens 89B in the first direction X, by means of the first moving frame 131. Also, the second hall element detects the position of the correcting lens 89B in the second direction Y, by means of the second moving frame 132. The first hall element is arranged at one side of the cylindrical coil 165, and the second hall element is arranged at the other side of the cylindrical coil 165. At predetermined positions the first hall element and second hall element detect the strength of the magnetic force of the magnet 137, and then output detection signals in accordance with the strength of the magnetic force. Based upon the detection signals from the two hall elements, a control device calculates the position of the correcting lens 89B by arithmetic operation.

The functions of the image stabilizer 83 with the above-described structure are as follows. The movement of the correcting lens 89B of the image stabilizer 83 is performed by selectively or simultaneously supplying a driving current of an appropriate value to the flat coil 164 and the cylindrical coil 165 of the actuator 134 via the flexible printed circuit board 162.

The flat coil 164 and the cylindrical coil 165 of the image stabilizer 83 are fixed to the coil supporting stand 157 by means of the flexible reinforcing plate 161, and further are fixed to the fixed base board 133 by means of the coil supporting stand 157. On this occasion, the thrust-generating portions of the flat coil 164 are extended in the second direction Y, and the thrust-generating portion of the cylindrical coil 165 is extended in the first direction X. Also, since the two magnets 137 and 137 fixed to both ends of the yoke 136 are arranged above and below both coils 164 and 165, the magnetic flux of a magnetic circuit formed by the yoke 136 and the two magnets 137 and 137 acts in such a manner as to vertically pass through the thrust-generating portions of the flat coil 164 and the thrust-generating portion of the cylindrical coil 165.

Meanwhile, the yoke 136 and the two magnets 137 and 137 are fixed to the first moving frame 131 holding the correcting lens 89B. The correcting lens 89B is supported by a first guide, which has the first moving frame 131, in a movable manner in the first direction X with respect to the second moving frame 132. Further, the correcting lens 89B is supported by a second guide, which has the second moving frame 132, in a movable manner in the second direction Y with respect to the fixed base board 133. Therefore, with the action of the first guide and the second guide, the correcting lens 89B is freely movable both in the first direction X and the second direction Y within a predetermined range.

If an electric current is applied to the flat coil 164 at present, the electric current flows in the second direction Y at the thrust-generating portions, because the thrust-generating portions are extended in the second direction Y. On this occasion, since the magnetic flux of the magnetic circuit acts in the up-and-down direction perpendicular to the thrust-generating portions, force directed in the first direction X acts on the magnets 137, 137 and the yoke 136 according to Fleming's left-hand rule. Thus, the first moving frame 131 to which the yoke 136 and the like are fixed moves in the first direction X. As a result, the correcting lens 89B held by the first moving frame 131 moves in the first direction X, guided by the first guide, in accordance with the magnitude of the electric current applied to the flat coil 164.

On the other hand, if an electric current is applied to the cylindrical coil 165, the electric current flows in the first direction X at the thrust-generating portion, because the thrust-generating portion is extended in the first direction X. On this occasion, since the magnetic flux of the magnetic circuit acts in the up-and-down direction perpendicular to the thrust-generating portion, force directed in the second direction Y acts on the magnets 137, 137 and the yoke 136 according to Fleming's left-hand rule. Thus, the second moving frame 132 moves in the second direction Y by means of the first moving frame 131 to which the yoke 136 and the like are fixed. As a result, the correcting lens 89B moves in the second direction Y, with the first moving frame 131 and the second moving frame 132 guided by the second guide, in accordance with the magnitude of the electric current applied to the cylindrical coil 165.

Also, if electric currents are simultaneously applied to the flat coil 164 and the cylindrical coil 165, the movement by the flat coil 164 and the movement by the cylindrical coil 165, both of which have been mentioned above, are performed in a combined manner. Specifically, the correcting lens 89B moves in the first direction X due to the action of the electric current which flows through the flat coil 164, and at the same time the correcting lens 89B moves in the second direction Y due to the action of the electric current which flows through the cylindrical coil 165. As a result, the correcting lens 89B moves in a diagonal direction, thereby stabilizing images of the lens system 81.

The image stabilizer 83 having the above-described structure and functions is attached to the lens device 5, as shown in FIGS. 9 to 14. The image stabilizer 83 is inserted into and pulled out of the opening portion 130, provided in the lower barrel 95 of the lens barrel 82, from the lateral direction, and is attached to the lower barrel 95 in a detachable manner. The reference numeral 170 shown in FIG. 14 denotes a cover member which opens and closes the opening portion 130. This cover member 170 is attached to the lens barrel 82, enabling the image stabilizer 83 to be covered.

The function of the lens system 81 of the lens device 5 in which the image stabilizer 83 has been installed are explained, referring to FIG. 13. When the imaging lens 7 of the lens device 5 is aimed at a subject, light from the subject is input from the imaging lens 7 to the inside of the lens system 81. On this occasion, light passed through the imaging lens 7 is refracted by 90° in the prism 85A, and after that, moves toward the CCD 4 along the optical axis L of the lens system 81. Specifically, light reflected in the prism 85A and then passed through the second lens 85B of the first-group lens 85 passes through the second-group lens 86, the third-group lens 87 and the fourth-group lens 88. Then the light passes through the seventh lens 89A and the correcting lens 89B of the fifth-group lens 89, subsequently passes through the optical filter 91, and eventually reaches the focusing screen of the CCD 4, thereby forming an image corresponding to the subject on the focal plane of the CCD 4.

In this regard, at the time of shooting, when camera shake and vibration are not given to the lens device 5, light from the subject moves through the center parts of the first-group to fifth-group lenses along the optical axis L like a light 200A as shown by the solid line. Therefore, an image is formed at a predetermined position on the focal plane of the CCD 4, and an excellent image can therefore be obtained without an image blur being caused.

On the other hand, at the time of shooting, when camera shake or vibration is applied to the lens device 5, light from the subject is input to the first-group lens in an inclined state as shown by the chain line of light 200B or as shown by the broken line of light 200C. At each of the first-group to fifth-group lenses, the incident lights 200B and 200C pass through the lenses, deviating from the optical axis L, however, it is possible to correct the camera shake or the like by moving the correcting lens 89B by a predetermined amount in accordance with the camera shake or the like. This makes it possible to form an image at a predetermined position on the focal plane of the CCD 4, and an excellent image can be obtained by eliminating image blurring.

As shown in FIG. 3, the lens device 5 including the image stabilizer 83 with such structure is attached to the front case 10 with a protector 180 arranged in between. The protector 180 is formed of a frame member having a size with which approximately the whole of the surface projected to the front side of the lens device 5 can be covered. The protector 180 includes: a first opening hole 181, a second opening hole 182, a third opening hole 183, a fourth opening hole 184 and the like. The first opening hole 181 exposes the imaging lens 7 of the lens device 5. The second opening hole 182 exposes the light-emitting portion 74a of the flash apparatus 74. The third opening hole 183 is provided for the light-receiving and light-emitting portions of the autofocus mechanism. The fourth opening hole 184 stores the protruding portion at the front of the lens barrel 82.

Since the fourth opening hole 184 is provided in the protector 180 and the stepped portion 21 is provided at a part of the front surface portion 10a of the front case 10 corresponding to the imaging lens 7, a level difference between the forefront part of the lens barrel 82 and the front surface of the imaging lens 7 can be eliminated. Further, there is a supporting structure in which the back surface of the flat display panel 2 is in contact with the lens barrel 82 having high rigidity (strength) with the LCD frame 64 arranged in between. Therefore, the flat display panel 2 can be prevented from being broken or the like, which is caused by force applied from the outside when operating the apparatus by touching the display surface thereof.

The reference numeral 186 shown in FIG. 3 denotes a pressing plate which prevents the arm member 29 from being lifted. The pressing plate 186 is formed of a wide plate extending in the up-and-down direction and has a size with which the first and second arm portions 29b and 29c can be covered with respect to the whole stroke of the arm member 29. The pressing plate 186 is fastened to be fixed to the guide member 26 by four fixing screws 187.

The flat display panel 2 can be prevented from being broken or the like as follows. As shown in FIGS. 1 to 3 and other figures, the lens device 5 includes the above-described image stabilizer 83 attached thereto, and so at the bottom of the lens barrel 82 are formed a front protruding portion 82a, a rear protruding portion 82b and the like. Among those, the front protruding portion 82a of the lens barrel 82 is stored in a predetermined position by being fitted in the fourth opening hole 184 of the protector 180 as described above. On the other hand, in the back of the lens device 5 the rear protruding portion 82b protrudes backward, and so the rear protruding portion 82b is used to reduce an elastically-deformed amount of the flat display panel 2. Therefore, the flat display panel 2 can be prevented from being broken or the like as well as the increase in thickness of the whole of a camera being minimized.

As regards an imager apparatus in related art, the whole of the back surface of the flat display panel 2 is supported by the main frame 12, however, because of demand for the weight reduction and miniaturization of the imager apparatus, the board thickness of the main frame 12 may be required to be small as well. Thus, the strength (rigidity) of the main frame 12 lowers as the board thickness decreases, and so if force greater than necessary is applied from the outside to the operational surface of the flat display panel 2, it is feared that the main frame 12 may be elastically-deformed similarly by the external force, and so the flat display panel 2 may be greatly elastically-deformed as well.

Different from the main frame 12, the lens barrel 82 of the lens device 5 is formed strong by block-shaped members, and with external force being applied to some degree, the lens barrel 82 may not be elastically-deformed and has sufficiently high strength (rigidity). Since the rear protruding portion 82b of the lens barrel 82 is in contact with the back surface of the flat display panel 2 with the LCD frame 64 arranged in between, the lens barrel 82 receives great external force given to the operational surface. Accordingly, the flat display panel 2 can be prevented from being elastically-deformed excessively.

Accordingly, the main frame 12 is provided with an opening window 190 having a size allowing the rear protruding portion 82b of the lens barrel 82 to be penetrated. The rear protruding portion 82b is penetrated through the opening window 190, the end surface of which is in contact with the LCD frame 64. It should be noted that though the lens device 5 is also fixed to the main frame 12, the flat display panel 2 can be prevented from being elastically-deformed greatly as described earlier, because the rigidity of the lens barrel 82 is higher than that of the main frame 12. In addition, the rear protruding portion 82b of the lens barrel 82 may be directly in contact with the back surface of the flat display panel 2 without the LCD frame 64 being arranged in between.

The housing 3 and the lens cover 8 with the aforementioned structures can easily be assembled as follows, for example. First, an assembly process of the lens cover 8 is explained. The adhesive sheet 36 is attached to the inside of the frame portion 35b on the inner side of the decorative plate 35. Next, the frame 37 is fitted and stuck onto the adhesive sheet 36. Hereupon, a plurality of protrusions may be provided in advance on the inner surface of the front surface portion 35a of the decorative plate 35. After passing those protrusions through a plurality of holes provided in the frame 37, caulking may be carried out to fix the protrusions simultaneously.

After that, the wiping sheet 38 is stuck and fitted onto the frame 37 with adhesive. On this occasion, the brackets 43a to 43c and 44 of the frame 37 are made to protrude from the through-holes 53a to 53e in the wiping sheet 38. And the four sliding sheets 52 are attached to the surface of the frame 37, from which the brackets protrude, in the positions corresponding to the projecting portions 15a to 15d provided at four positions on the front case 10. With this, the assembly process of the lens cover 8 is completed. In addition, the two supporting rollers 40 are attached beforehand to the peaked portion 39 of the decorative plate 35 in a freely rotatable manner.

Next, an assembly process of the housing 3 is explained. First, as shown in FIG. 23 and other figures, the guide member 26 is installed in a predetermined position on the inner surface of the front case 10. As an attaching mechanism, a melting mechanism such as resistance welding may be used, and also a fastening mechanism such as adhesive may be used. Further, a fixing mechanism such as caulking may be used. Next, the lens cover 8 is faced to the front side of the front case 10, the brackets 43a to 43c and 44 of the frame 37 are inserted into the four opening portions 14a to 14d, and each of the ends is made to protrude inward. In this state, the arm member 29 is faced to the inner side of the front case 10, and three screw holes are positioned at the tips of the three bracket pieces 43a to 43c, respectively.

Next, the arm member 29 is fastened and fixed to the three bracket pieces 43a to 43c with three fixing screws 48. Further, the fastening plate 47 is fastened and fixed to the bracket convex portion 44 in the frame 37 with a fixing screw 48. Then, a resilient piece on one side of the torsion spring 49, whose resilient piece on the other side is locked in the insertion hole 30c of the arm member 29, is locked on the spring receiving pin 51 projecting on the inner surface of the front case 10. On this occasion, the first engagement pin 32a of the arm member 29 is engaged with the first guide groove 27a of the guide member 26, and the second engagement pin 32b of the arm member 29 is engaged with the second guide groove 27b of the guide member 26.

Next, the lens device 5 is attached to the protector 180, and the lens device 5 integrated is fitted into a predetermined position on the inner surface of the front case 10. On this occasion, the front protruding portion 82a of the lens device 5 is fitted into the fourth opening hole 184 of the protector 180. Next, the pressing plate 186 is fastened and fixed to the guide member 26 with the fixing screws 187. On this occasion, the protector 180 is pressed by means of part of the pressing plate 186 to be fastened and fixed by the pressing plate 186. The main frame 12 is arranged on the back surface of the lens device 5 held by the protector 180. On this occasion, the rear protruding portion 82b of the lens device 5 is fitted into the opening window 190 in the main frame 12.

The rear case 11 to which the flat display panel 2, control buttons and the like have been attached in advance is fitted onto the back surface of the front case 10 to which the lens device 5 has been thus attached. Hence, the rear protruding portion 82b of the lens barrel 82 of the lens device 5 held by the front case 10 lightly touches the back surface of the LCD frame 64 arranged on the back surface of the flat display panel 2 held by the rear case 11. On this occasion, by putting the front case 10 and the rear case 11 together, both the cases 10 and 11 are fitted together in a detachable manner by the engagement pieces 26d and 28a provided at three positions. Subsequently, the front and rear cases 10, 11 are reliably fastened and fixed together by fastening joints using fixing screws. Accordingly, the assembly process of the housing 3 and the like is completed.

The digital still camera 1 with the aforementioned structure can be used as follows, for example. FIGS. 4, 31B, 32B, 32C, 33A and 33B show a state in which the imaging lens 7 is covered with the lens cover 8. FIGS. 5, 31A and 32A show a state in which the imaging lens 7 is exposed by sliding the lens cover 8 downward. In order to change the lens cover 8 from the state shown, for example, in FIG. 4 to the state shown, for example, in FIG. 5, a user pushes the lens cover 8 down by applying force to the lens cover 8 from above.

On this occasion, when force directed downward is applied to the lens cover 8, the arm member 29 has been integrally fixed to the lens cover 8, and the two engagement pins 32a and 32b provided on the arm member 29 have been engaged in a slidable manner with the two guide grooves 27a and 27b of the guide member 26 fixed to the front case 10. The two guide grooves 27a and 27b are extended in the up-and-down direction in which the lens cover 8 should be moved, and therefore, the lens cover 8 can be moved from the first position to the second position with ease by the two engagement pins 32a and 32b sliding in the up-and-down direction being guided by the guide grooves 27a and 27b.

In particular, as is obvious from FIGS. 19, 24 and other figures, since the length T of the two engagement pins 32a and 32b in the sliding direction is made longer than the length (height) H of the lens cover 8 in the sliding direction (T>H), the lens cover 8 can slide smoothly. This point will be explained in detail in the followings. As is obvious from FIG. 18 and other figures, the lens cover 8 according to the present embodiment is approximately rectangular in shape being laterally long. Therefore, at the time of sliding, there is no disadvantage when external force acts approximately on the center portion in the lengthwise direction. However, when external force acts on a position shifted to one side in the left-and-right direction, torque which causes the lens cover 8 to rotate acts on the lens cover 8 as well as force directed toward the up-and-down direction.

However, in the present embodiment, since the two engagement pins 32a and 32b are arranged in the sliding direction, and the length T of the two engagement pins 32a and 32b is greater than the length (height) H of the lens cover 8 in the sliding direction, these two engagement pins 32a and 32b act so as to reduce the aforementioned torque. Therefore, the two engagement pins 32a and 32b reduce the occurrence of torque, allowing the lens cover 8 to smoothly move in a sliding direction. Furthermore, the arm member 29 is provided with the auxiliary arm portion 29e extending in the direction perpendicular to the sliding direction, and the auxiliary arm portion 29e is fixed to the lens cover 8, reliably preventing external force from causing the lens cover 8 to rotate.

Also, in this present embodiment, since the stepped portion 21 is provided at the upper part of the housing 3, particularly at the part where the imaging lens 7 faces, and only that part is made thin, a digital still camera 1 having favorably thin appearance when seen from above can be provided. Therefore, a digital still camera 1 excellent in terms of design can be provided, enabling users to have a sense of stability, which proves that the digital still camera 1 is user-friendly. Moreover, since the stepped portion 21 of the housing 3 is reliably covered by the peaked portion 39 provided on the decorative plate 35 of the lens cover 8, foreign particles, dust and the like can be prevented from entering inside the lens cover 8 from the gap thereof. Also, if the surface of the front case 10 is coated with foreign particles or the like, those are wiped off by the wiping sheet 38 provided on the inner side of the lens cover 8, and so the surface of the front case 10 is not scratched, and foreign particles, dust and the like can reliably be prevented from entering.

In particular, as shown in FIG. 33A, regarding the housing 3 according to the present embodiment, the stepped portion 21 is provided on the housing 3, making the thickness M1 of the upper surface smaller than the thickness M2 of the lower surface (M1<M2). Therefore, gap is eliminated by allowing the peaked portion 39 of the lens cover 8 to be engaged with the stepped portion 21. Accordingly, at the time of shooting, eclipse is not caused with respect to light from a subject by the lens opening hole 16 of the front case 10, and excellent shooting can be performed. On the other hand, as shown in FIG. 33C, if the front surface portion of the front case 10 is not provided with a stepped portion, and the thickness M of the upper surface is equal to the thickness M of the lower surface, a lens opening hole 16*a* may protrude forward and the gap N between the lens opening hole 16*a* and the imaging lens 7 is enlarged. Hence, it is feared that eclipse may be caused at the time of shooting, which makes excellent shooting difficult.

As explained above, according to an imager apparatus of an embodiment, a digital still camera includes a housing in which a level difference is provided at an imaging lens portion to make the housing thinner, where a lens cover including a peaked portion having inverted L-shaped cross section is provided, and an imaging lens is opened and closed by the lens cover. Therefore, the whole of the housing can be made thin, though a lens device which has protruding portions such as a camera shake correcting device at the lower part of the imaging lens is stored in the housing. Further, a lens barrel is in contact with the back surface of a flat display panel without a main frame being arranged in between. Therefore, external force given to the operational surface of the flat display panel is received by the lens barrel, preventing the flat display panel from being elastically-deformed greatly, preventing the flat display panel from being broken or the like.

The present invention is not limited to the embodiment described earlier and shown in the drawings, but various modified embodiments are possible without deviating from the gist of the present invention. For example, although examples in which a digital still camera is used as an imager apparatus have been explained in the aforementioned embodiment, the present invention can be applied to digital video cameras, camera-incorporated personal computers, camera-incorporated mobile phones and other imager apparatuses as well. Further, although examples in which five-group lenses are used as a lens device 1 have been explained, it should be appreciated that four or fewer group lenses and also six or more group lenses can be used as well.

It should be understood by those skilled in the art that various modifications, combinations, sub-combinations and alterations may occur depending on design requirements and other factors insofar as they are within the scope of the appended claims or the equivalents thereof.

What is claimed is:

1. An imager apparatus comprising:
a housing in which a lens device is stored with an imaging lens being exposed to the front surface facing a subject;
a lens cover movable between a first position to cover said imaging lens and a second position to open said imaging lens; and
a cover moving mechanism which linearly moves said lens cover between said first position and said second position;
wherein said cover moving mechanism includes a plurality of brackets provided on said lens cover; a plurality of opening portions provided in the front surface of said housing, corresponding to said plurality of brackets, through which the tips of said brackets penetrate; an arm member fixed to said plurality of brackets on the inner side of said housing; a guide member which guides said arm member in the moving direction of said lens cover; and a slide joining mechanism which joins said arm member to said guide member in a slidable manner.

2. An imager apparatus according to claim 1, wherein said slide joining mechanism includes at least one guiding groove provided on one of said arm member and said guide member and extended in said moving direction; and at least one engagement pin provided on the other of said arm member and said guide member and engaged with said guiding groove in a slidable manner.

3. An imager apparatus according to claim 2, wherein said engagement pins are two, and the distance between said two engagement pins is longer than the length of said lens cover in said moving direction.

4. An imager apparatus according to claim 2, wherein said arm member has two engagement pins, and said two engagement pins are provided on an arm portion extending on both sides in said moving direction.

5. An imager apparatus according to claim 2, wherein said arm member has two engagement pins, and said two engagement pins are provided on an arm portion extending on one side in said moving direction.

6. An imager apparatus according to claim 1, wherein said arm member is formed of a spring material in the shape of a plate.

7. An imager apparatus according to claim 1, wherein said arm member is provided with an auxiliary arm extending in a direction intersecting said moving direction and being fixed to said brackets.

8. An imager apparatus according to claim 1, wherein a supporting roller is provided on the inner surface of said lens cover, being in contact with the front surface of said housing in a freely rotatable manner.

9. An imager apparatus according to claim 1, wherein a wiping member which slides in contact with the front surface of said housing is provided on roughly the whole of the inner surface of said lens cover, except for parts corresponding to said plurality of brackets.

* * * * *